(12) United States Patent
Suemitsu et al.

(10) Patent No.: US 11,988,465 B2
(45) Date of Patent: May 21, 2024

(54) RADIATIVE COOLING DEVICE AND RADIATIVE COOLING METHOD

(71) Applicant: Osaka Gas Co., Ltd., Osaka (JP)

(72) Inventors: Masahiro Suemitsu, Osaka (JP); Tadashi Saito, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 730 days.

(21) Appl. No.: 17/260,742

(22) PCT Filed: Mar. 9, 2020

(86) PCT No.: PCT/JP2020/009989
§ 371 (c)(1),
(2) Date: Jan. 15, 2021

(87) PCT Pub. No.: WO2020/195743
PCT Pub. Date: Oct. 1, 2020

(65) Prior Publication Data
US 2021/0262745 A1 Aug. 26, 2021

(30) Foreign Application Priority Data

Mar. 27, 2019 (JP) .................................. 2019-060427
Sep. 13, 2019 (JP) .................................. 2019-167164

(51) Int. Cl.
*F28F 21/08* (2006.01)
*B32B 7/023* (2019.01)
(Continued)

(52) U.S. Cl.
CPC ............ *F28F 21/089* (2013.01); *B32B 7/023* (2019.01); *B32B 7/027* (2019.01); *B32B 7/12* (2013.01);
(Continued)

(58) Field of Classification Search
CPC ...... F28F 21/089; F28F 2245/06; F28F 13/18; B32B 7/023; B32B 7/12; B32B 7/027;
(Continued)

(56) References Cited

U.S. PATENT DOCUMENTS

2006/0077320 A1* 4/2006 Hata .................... G02B 5/3083
349/97
2015/0338175 A1* 11/2015 Raman ..................... F28F 3/12
165/185
2016/0003989 A1* 1/2016 Watanabe ............... C23C 14/14
359/359
2018/0180331 A1 6/2018 Yu et al.
(Continued)

FOREIGN PATENT DOCUMENTS

CN 105116478 B * 9/2017 .......... C09K 19/322
CN 107883493 A 4/2018
(Continued)

*Primary Examiner* — Kun Kai Ma
(74) *Attorney, Agent, or Firm* — The Webb Law Firm

(57) ABSTRACT

A radiative cooling device having high flexibility that can be retrofitted to an existing outdoor facility.

An infrared radiative layer for radiating infrared light from a radiative surface and a light reflective layer disposed on the side opposite to the presence side of the radiative surface of the infrared radiative layer are provided. The infrared radiative layer is a resin material layer whose thickness is adjusted to discharge a greater thermal radiation energy than absorbed solar light energy in a wavelength band ranging from 8 μm to 14 μm.

24 Claims, 15 Drawing Sheets

(51) Int. Cl.
  *B32B 7/027* (2019.01)
  *B32B 7/12* (2006.01)
  *B32B 27/36* (2006.01)
  *G02B 1/04* (2006.01)
  *G02B 5/20* (2006.01)
  *G02B 5/26* (2006.01)

(52) U.S. Cl.
  CPC ............... *B32B 27/36* (2013.01); *G02B 1/04* (2013.01); *G02B 5/208* (2013.01); *G02B 5/26* (2013.01); *B32B 2255/205* (2013.01); *B32B 2307/732* (2013.01); *F28F 2245/06* (2013.01)

(58) Field of Classification Search
  CPC ............. B32B 27/36; B32B 2255/205; B32B 2307/732; B32B 2250/24; B32B 15/043; B32B 15/06; B32B 15/085; B32B 15/09; B32B 27/08; B32B 2307/416; B32B 25/08; B32B 25/20; B32B 2255/28; B32B 2270/00; G02B 1/04; G02B 5/208; G02B 5/26
  See application file for complete search history.

(56) References Cited

U.S. PATENT DOCUMENTS

| | | | |
|---|---|---|---|
| 2018/0212157 A1* | 7/2018 | Oshiyama | C07D 491/22 |
| 2020/0240725 A1* | 7/2020 | Suemitsu | G02B 5/208 |
| 2020/0398531 A1* | 12/2020 | Suemitsu | F28F 21/08 |
| 2020/0400391 A1* | 12/2020 | Suemitsu | B32B 17/061 |
| 2021/0024409 A1* | 1/2021 | Suemitsu | B32B 17/06 |
| 2022/0357116 A1 | 11/2022 | Yang et al. | |

FOREIGN PATENT DOCUMENTS

| | | | |
|---|---|---|---|
| CN | 107923718 A | 4/2018 | |
| CN | 108995257 A | 12/2018 | |
| CN | 109070695 A | 12/2018 | |
| EP | 1283106 A1 * | 2/2003 | ....... B32B 17/10018 |
| JP | 2008134579 A * | 6/2008 | ........... G02F 1/1336 |
| JP | 2008242349 A * | 10/2008 | |
| JP | 20134708 A | 1/2013 | |
| JP | 2018526599 A | 9/2018 | |
| JP | 2019515967 A | 6/2019 | |
| WO | 2016205717 A1 | 12/2016 | |
| WO | WO-2016205717 A1 * | 12/2016 | ............ B32B 27/18 |
| WO | 2017151514 A1 | 9/2017 | |

* cited by examiner

Fig.14
| material | membrane thickness | material temperature | outside temperature | radiative cooling capacity in daytime |
|---|---|---|---|---|
| silicone rubber | 1 | 34.4 | 35.1 | yes |
| | 5 | 32.8 | 34.5 | yes |
| | 10 | 33.5 | 35.3 | yes |
| fluoroethylene vinyl ether | 5 | 33.6 | 34.2 | yes |
| | 10 | 33.7 | 35.0 | yes |
| | 50 | 32.5 | 34.6 | yes |
| modified olefin | 1 | 37.4 | 35.0 | no |
| | 5 | 37.1 | 35.0 | no |
| | 10 | 37.3 | 35.4 | no |
| vinyl chloride resin | 80 | 26.5 | 29.5 | yes |
| | 300 | 27.4 | 28.2 | yes |
Fig.15
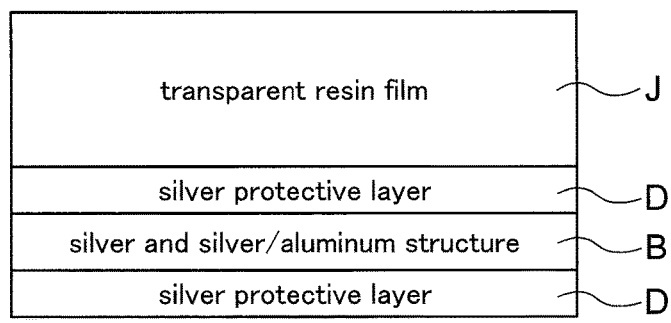
Fig.16
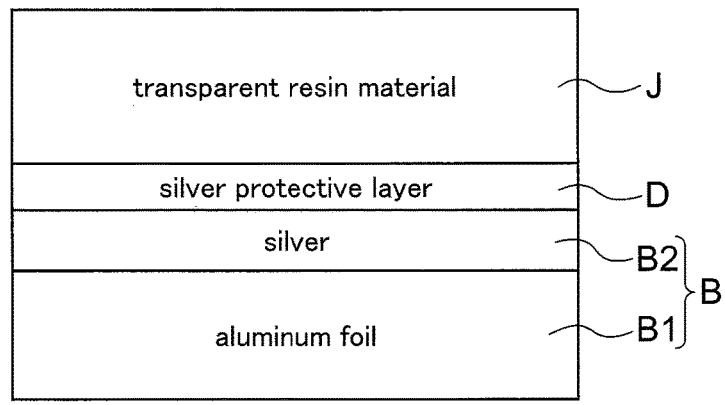

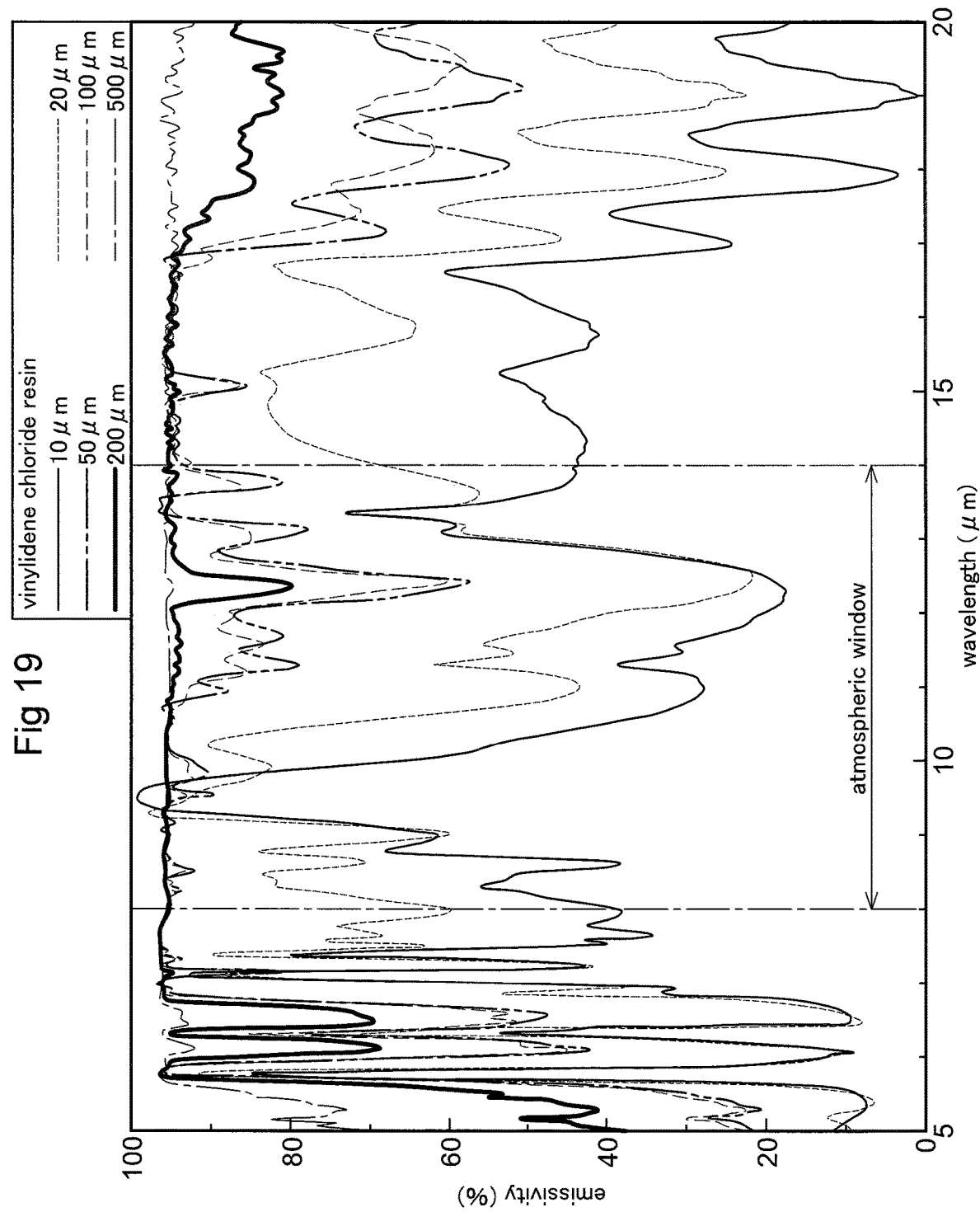

RADIATIVE COOLING DEVICE AND RADIATIVE COOLING METHOD

CROSS-REFERENCE TO RELATED APPLICATIONS

This application is the United States national phase of International Application No. PCT/JP2020/009989 filed Mar. 9, 2020, and claims priority to Japanese Patent Application Nos. 2019-060427 filed Mar. 27, 2019, and 2019-167164 filed Sep. 13, 2019, the disclosures of which are hereby incorporated by reference in their entirety.

TECHNICAL FIELD

The present invention relates to a radiative cooling device configured such that an infrared radiative layer for radiating infrared light from a radiative surface and a light reflective layer disposed on the side opposite to the presence side of the radiative surface of the infrared radiative layer are provided. The invention relates also to a radiative cooling method using this radiative cooling device.

BACKGROUND ART

Radiative cooling refers to a phenomenon in which a substance radiates electromagnetic waves such as infrared rays to the surrounding, whereby the temperature thereof is lowered. With utilization of this phenomenon, it is possible to configure a radiative cooling device that can cool an object without consuming energy such as electricity.

By the way, the light reflective layer reflects the light (visible light, ultraviolet light, infrared light) transmitted through the infrared radiative layer from the radiative surface, thus preventing such light (visible light, ultraviolet light, infrared light) transmitted through the infrared radiative layer from being projected onto the cooling target to heat this cooling target.

Incidentally, the light reflective layer has a further function of reflecting not only the light transmitted through the infrared radiative layer, but also the light radiated from the infrared radiative layer to the presence side of the light reflective layer toward the infrared radiative layer. However, the following explanation will be made on a premise that the light reflective layer is provided for the purpose of reflecting the light (visible light, ultraviolet light, infrared light) transmitted through the infrared radiative layer.

As a conventional example of such radiative cooling device, there is known a device including an infrared radiative layer constituted of silicon dioxide and hafnium oxide (see e.g. U.S. Patent Application Publication No. 2015/0338175 (patent Document 1)).

By the way, U.S. Patent Application Publication No. 2015/0338175 (Patent Document 1) illustrates also use of an optical glass as the infrared radiative layer.

BACKGROUND ART DOCUMENT

Patent Document

Patent Document 1: detailed disclosure of U.S. Patent Application Publication No. 2015/0338175

SUMMARY OF THE INVENTION

In the conventional radiative cooling device disclosed in Patent Document 1, since the infrared radiative layer is constituted of inorganic materials, the device lacks flexibility. Namely, even if the light reflective layer is configured as e.g. a silver membrane thus having flexibility, due to the lack of flexibility in the infrared radiative layer formed of inorganic materials, the radiative cooling device lacks flexibility.

Therefore, it was difficult to retrofit the conventional radiative cooling device in e.g. an exterior wall or the like of an existing outdoor facility, for providing radiative cooling capacity.

The present invention has been made in view of the above-described state of the art and its object is to provide a radiative cooling device with flexibility and to provide also a radiative cooling method using such radiative cooling device.

A radiative cooling device according to the present invention configured such that an infrared radiative layer for radiating infrared light from a radiative surface and a light reflective layer disposed on the side opposite to the presence side of the radiative surface of the infrared radiative layer are provided, the radiative cooling device being characterized in that:

the infrared radiative layer comprises a resin material layer whose thickness is adjusted to discharge a greater thermal radiation energy than absorbed solar light energy in a band ranging from 8 µm to 14 µm wavelength.

Namely, solar light incident to the radiative surface of the resin material layer as an "infrared radiative layer", is transmitted through the resin material layer, and then reflected by the light reflective layer on the side opposite to the presence side of the radiative surface of the resin material layer and released from the radiative surface to the outside of the system.

Incidentally, in the description of this detailed disclosure, in the case of reference to simply as "light", the intended concept of this light is understood to be inclusive of ultraviolet light, visible light and infrared light. Referring to these in terms of the wavelengths of the light as electromagnetic waves, the concept includes electromagnetic waves having wavelengths ranging from 10 nm to 20000 nm (electromagnetic waves from 0.01 µm to 20 µm).

Further, heat transferred (heat input) to the radiative cooling device is converted into infrared radiation by the resin material layer and released from the radiative surface to the outside of the system.

In this way, with the above-described arrangement, solar light irradiated onto the radiative cooling device can be reflected and also heat transferred to the radiative cooling device (e.g. heat transferred from the atmosphere, heat transferred from the cooling target to be cooled by the radiative cooling device) can be radiated as infrared light to the outside of the system.

Moreover, since the infrared radiative layer has its thickness adjusted to discharge a greater thermal radiation energy than absorbed solar light energy in a band ranging from 8 µm to 14 µm wavelength, the cooling function can be achieved even in environment under solar radiation.

And, since the resin material layer is formed of a resin material having high flexibility, it is possible to provide the resin material layer with flexibility. By the way, the light reflective layer can be provided with flexibility by being formed as a silver membrane for instance.

Therefore, it is possible to provide flexibility to a radiative cooling device having a resin material layer and a light reflective layer.

In short, according to the characterizing feature of the radiative cooling device of the present invention, it is possible to provide a radiative cooling device having flexibility.

According to a further characterizing feature of the radiative cooling device of the present invention, the light reflective layer has reflectance equal to or greater than 90% for wavelengths from 0.4 µm to 0.5 µm and reflectance equal to or greater than 96% for wavelengths longer than 500 nm.

Namely, the solar light spectrum exists from 0.3 µm to 4 µm wavelength. And, its intensity increases as the wavelength becomes greater than 0.4 µm. The intensity is particularly high from the wavelength of 0.5 µm to wavelength of 2.5 µm.

Thus, if the light reflective layer is provided with the reflectance characteristics which is equal to or greater than 90% for wavelengths from 0.4 µm to 0.5 µm and equal to or greater than 96% for wavelengths longer than 0.5 µm, this light reflective layer absorbs only about equal to or less than 5% of the solar light energy.

As a result, at the time of meridian crossing in summer time, the solar light energy absorbed by the light reflective layer can be made to be equal to or less than 50 W/m$^2$ approximately, so that the radiative cooling by the resin material layer can be carried out favorably.

Incidentally, in this detailed disclosure, regarding the solar light, unless explicitly indicated otherwise, its spectrum is defined as AM 1.5G standard.

In short, according to the further characterizing feature of the radiative cooling device of the present invention, it is possible to carry out the radiative cooling by the resin material layer favorably with effective suppression of solar light energy absorption by the light reflective layer.

According to a still further characterizing feature of the radiative cooling device of the present invention:
  the membrane thickness of the resin material layer is adjusted to obtain:
    light absorption characteristics that provide light absorbance equal to or less than 13% for wavelength average from 0.4 µm to 0.5 µm, light absorbance equal to or less than 4% for wavelength average from 0.5 µm to 0.8 µm, light absorbance equal to or less than 1% for wavelength average from 0.8 µm to 1.5 µm, and light absorbance equal to or less than 40% for wavelength average from 1.5 µm to 2.5 µm; and
    heat emissivity characteristics of equal to or greater than 40% for wavelength average of the emissivity from 8 µm to 14 µm.

Incidentally, the wavelength average of light absorbance from 0.4 µm to 0.5 µm means an average value of light absorbances for respective wavelengths from 0.4 µm to 0.5 µm. And, other similar descriptions including the one concerning the emissivity means also a similar average value. The same is true with the following discussion in this detailed disclosure.

Namely, with the resin material layer, the light absorbance and the emissivity (light emissivity) varies with its thickness. For this reason, it is necessary to adjust the thickness of the resin material layer so that this layer will absorb as little as possible of solar light and provide a high heat emissivity in the wavelength range of the so-called atmospheric window range (the range of light wavelength from 8 µm to 20 µm).

Specifically, from the viewpoint of the light absorbance (light absorbance characteristics) for solar light of the resin material layer, it is necessary that the wavelength average of light absorbance from 0.4 µm to 0.5 µm be equal to or less than 13%, the wavelength average of light absorbance from 0.5 µm to 0.8 µm be equal to or less than 4%, the wavelength average of light absorbance from 0.8 µm to 1.5 µm be equal to or less than 1%, and the wavelength average of light absorbance from 1.5 µm to 2.5 µm be equal to or less than 40%. Incidentally, regarding the light absorbance from 2.5 µm to 4 µm, the wavelength average may be 1 equal to or less than 100%.

When such light absorbances are present in distribution, the light absorbance for the solar light becomes equal to less than 10%, which is equal to or less than 100 W in terms of energy.

That is, the light absorbance for the solar light increases with increase of the membrane thickness of the resin material layer. If the resin material layer is formed as a thick membrane, the emissivity for the atmospheric window becomes substantially 1 (one) and heat radiation to the (cosmic) space becomes from 125 W/m$^2$ to 160 W/m$^2$.

As described above, preferably, the solar light absorption of the light reflective layer is equal to or less than 50 W/m$^2$.

Therefore, if the sum of the solar light absorption by the resin material layer and the solar light absorption by the light reflective layer is equal to or less than 150 W/m$^2$ and the condition of the atmosphere is good, the cooling will be promoted. And, advantageously, the resin material layer employs a material that has low absorbance in the vicinity of the peak value of the solar light spectrum, as described above.

Further, from the viewpoint of the emissivity (heat emissivity characteristics) for radiating the infrared light of the resin material layer, the wavelength average of the emissivity from 8 µm to 14 µm needs to be equal to or greater than 40%.

Namely, in order to allow the resin material layer to release the heat radiation of solar light absorbed by the light reflective layer of about 50 W/cm$^2$ from the resin material layer to the space, it is necessary for the resin material layer to output more heat radiation than this.

For example, when the outside temperature is 30° C., the maximum value of the heat radiation of the atmospheric window from 8 µm to 14 µm in wavelength is 200 W/m$^2$ (calculated on a premise of emissivity being 1). And, this value is obtained at the time of fine weather in an dry environment with thin air such as on a high mountain. The thickness of the atmosphere becomes greater in a lowland than a high mountain place, so the wavelength range of the atmospheric window becomes narrower and the transmittance becomes lower. Incidentally, this phenomenon is referred to as: "atmospheric window narrows (narrowing of atmospheric window)".

Moreover, the environment in which the radiative cooling device is actually used can have high humidity. In this case too, the atmospheric window narrows. Heat radiation generated in the range of atmospheric window in the case of use in a lowland is estimated to be 160 W/cm$^2$ at 30° C., when the conditions are good (calculated based on a premise of emissivity being 1).

Further, as it often happens in Japan, when there exists mist or smog in the sky, the atmospheric window will further narrow and the radiation to the space will become 125 W/m$^2$ approximately.

In view of the above-described situations, use in a land of mid altitude is not possible unless the wavelength average of the emissivity from 8 µm to 14 µm is equal to or greater than 40% (heat radiation intensity in the atmospheric window range equal to or greater than 50 W/m$^2$).

Therefore, by adjusting the thickness of the resin material layer to the above-described range of optical standard, the heat output for the atmospheric window becomes greater than the heat input by the light absorption of the solar light, and radiative cooling effect can be provided outdoors even under sun environment in daytime.

In short, according to the still further characterizing feature of the radiative cooling device of the present invention, the heat output of the atmospheric window becomes greater than the heat input by the light absorption of the solar light, and radiative cooling effect can be provided even outdoors under solar radiated environment in daytime.

According to a still further characterizing feature of the radiative cooling device of the present invention, the resin material forming the resin material layer is selected from resins containing at least one or more of carbon-fluorine bond, siloxane bond, carbon-chlorine bond, carbon-oxygen bond, ethel bond, ester bond and benzene ring.

Namely, as the material for forming the resin material layer, a colorless resin material having one or more of carbon-fluorine bond (C—F), siloxane bond (Si—O—Si), carbon-chlorine bond (C—Cl), carbon-oxygen bond (C—O), ethel bond (R—COO—R), ester bond (C—O—C), and benzene ring can be employed.

According to the Kirchhoff's laws, the emissivity ($\varepsilon$) and the light absorbance (A) are equal. The light absorbance (A) can be obtained from the absorbance ($\alpha$) by following Formula (1).

$$A = 1 - \exp(-\alpha t) \quad \text{(Formula 1)}.$$

where t denotes the membrane thickness.

Namely, with increase of the thickness of the resin material layer, a greater heat emissivity can be obtained in a wavelength range having high absorption coefficients. In case radiative cooling is implemented outdoors, it is advantageous to employ a material having large absorption coefficient in the wavelength from 8 µm to 14 µm. Also, for the sake of suppression of solar light absorption, it is advantageous to employ a material that has no or only small absorption coefficient in the wavelength from 0.3 µm to 4 µm, in particular, from 0.4 µm to 2.5 µm. As may be understood from the relational expression described above, the light absorbance (emissivity) varies with membrane thickness of the resin material layer.

In order to lower the temperature than the surrounding atmosphere by radiative cooling in solar radiated environment, with selection of a material that has a large absorption coefficient in the wavelength range of the atmospheric window and that also has almost no absorption coefficient in the wavelength range of solar light, through adjustment of the membrane thickness of the resin material layer, it is possible to create a condition in which the solar light is hardly absorbed, but large heat radiation for the atmospheric window is produced, namely, a condition of the output of the radiative cooling being greater than the input of solar light.

Next, additional explanation will be made on the absorption spectrum of the resin material forming the resin material layer.

Regarding the carbon-fluorine bond (C—F), the absorption coefficients due to CHF and $CF_2$ are distributed broadly in the wide range from 8 µm to 14 µm wavelength which is the atmospheric window, and the absorption coefficient is particularly high at 8.6 µm. Also, respecting the wavelength range of the solar light, no distinct absorption coefficients are is found at the wavelengths of 0.3-2.5 µm where the energy is large.

As examples of resin materials having the C—F bond, there are cited:

polytetrafluoroethylene (PTFE) which is a fully fluorinated resin;

polychlorotrifluoroethylene (PCTFE), polyvinylidene fluoride (PVDF) and polyvinyl fluoride (PVF), which are partially fluorinated resins;

perfluoroalkoxy fluororesin (PFA) which is a fluorinated resin copolymer;

tetrafluoroethylene/hexafluoropropylene copolymer (FEP);

ethylene/tetrafluoroethylene copolymer (ETFE); and ethylene/chlorotrifluoroethylene copolymer (ECTFE).

Bonding energies of the C—C bond, C—H bond and C—F bond in the basic structure portion exemplified by polyvinylidene fluoride (PVDF) are obtained respectively as 4.50 eV, 4.46 eV and 5.05 eV, which correspond respectively to 0.275 µm wavelength, 0.278 µm wavelength and 0.246 µm wavelength, and the light on the shorter wavelength side than these wavelengths is absorbed.

The solar light spectrum exists only on the wavelength longer than 0.300 µm wavelength. So, when a fluororesin is employed, the ultraviolet rays, the visible rays and the near infrared rays are hardly absorbed.

Incidentally, the ultraviolet rays are defined as the range of wavelength side shorter than 0.400 µm, the visible rays are defined as the range of wavelength from 0.400 µm to 0.800 µm, the near infrared rays are defined as the range of wavelength from 0.800 µm to 3 µm, and the mid infrared rays are defined as the range of wavelength from 3 µm to 8 µm, and the far infrared rays are defined as the range of wavelength longer than 8 µm, respectively.

As examples of resin material having the siloxane bond (Si—O—Si), silicone rubber and silicone resin are cited. With such resins, a large absorption coefficient due to stretching of the C—Si bond appears broadly around the wavelength of 13.3 µm and an absorption coefficient due to symmetric out-of-plane bending vibration (wagging) of $CSiH_2$ appears broadly centering about 10 µm wavelength and symmetric in-plane bending vibration (scissoring) of $CSiH_2$ appears small in the vicinity of 8 µm wavelength. In this way, it has a large absorption coefficient for the atmospheric window. Respecting the ultraviolet region, the main chain Si—O—Si bond energy is 4.60 eV, which corresponds to the wavelength of 0.269 µm and the light on the shorter wavelength side than this is absorbed. Since the solar light spectrum exists only in the longer wavelength than 0.300 µm wavelength, when the siloxane bond is used, the ultraviolet rays, the visible rays and the near infrared rays of the solar light are hardly absorbed.

Regarding the carbon-chlorine bond (C—Cl), the absorption coefficient due to C—Cl stretching vibration appears in a wide band having a half width of 1 µm or more and centered about 12 µm wavelength.

Also, as an example of resin material having a carbon-chlorine bond (C—Cl), polyvinyl chloride is cited. However, in the case of polyvinyl chloride, due to the influence of electron withdrawal of chlorine, the absorption coefficient due to the bending vibration of C—H of the alkene contained in the main chain appears around 10 µm wavelength. Namely, a large amount of heat radiation is outputted in the wavelength range of the atmospheric window. The binding energy between carbon and chlorine of alkenes is 3.28 eV, which corresponds to the wavelength of 0.378 µm and the light shorter than this wavelength is absorbed. Namely, although it absorbs the ultraviolet rays of the solar light, it has little absorption for the visible range.

Regarding the ether bond (R—COO—R) and the ester bond (C—O—C). these have absorption coefficients for the wavelengths from 7.8 µm to 9.9 µm. Further, respecting the carbon-oxygen bond included in the ester bond and the ether bond, a strong absorption coefficient appears in the wavelength range from 8 µm to 10 µm.

If a benzene ring is introduced in the side chain of the hydrocarbon resin, due to the vibration of the benzene ring per se or the vibration of the surrounding elements due to the influence of the benzene ring, absorption appears broadly from the wavelength of 8.1 µm to 18 µm.

As examples of reins having these bonds, polymethylmethacrylate resin, ethyleneterephthalate resin, polytrimethylene terephthalate, polybutylene terephthalate, polyethylene naphthalate, and polybutylene naphthalate are cited. For example, methyl methacrylate has a C—C bond energy of 3.93 eV, which corresponds to the wavelength of 0.315 µm and absorbs solar light with wavelengths shorter than this wavelength. However, it has almost no absorption in the visible range.

As long as the resin material forming the resin material layer has the above-described emissivity and the absorbance characteristics, the resin material layer may be a mono-layer membrane of one kind of resin material or a multi-layered membrane of a plurality of kinds of resin material, or a mono-layered membrane of a plurality of kinds of resin material blended together or a multi-layered membrane of a plurality of kinds of resin material blended together. Incidentally, such blends include copolymers such as mutual copolymers, random copolymers, block copolymers, graft copolymers, etc. as well as modified products with side chain substitution.

In short, according to the further characterizing feature of the radiative cooling device of the present invention, it is possible to create a situation of the output of radiative cooling being greater than the input of solar light.

According to a still further characterizing feature of the radiative cooling device of the present invention:
the main component of the resin material forming the resin material layer is siloxane; and
the resin material layer has a thickness equal to or greater than 1 µm.

Namely, as may be understood from the above-described Formula 1: $A=1-\exp(-\alpha t)$, the light absorbance (emissivity) varies with the thickness (t). The resin material needs to have a thickness which provides a large light absorption coefficient (emissivity) for the atmospheric window.

In the case of a resin material whose main component is the siloxane bond (Si—O—Si), if it has a membrane thickness equal to or greater than 1 µm, this results in high emissivity intensity for the atmospheric window, so that the situation of the output of radiative cooling being greater than the input of solar light can be created.

In short, according to the still further characterizing feature of the radiative cooling device of the present invention, in case the main component of the resin material forming the resin material layer is siloxane, the situation of the output of radiative cooling being greater than the input of solar light can be created.

According to a still further characterizing feature of the radiative cooling device of the present invention, the resin material layer has a thickness equal to or greater than 10 µm.

Namely, in the case of the resin material whose main component is any one of the carbon-fluorine bond (C—F), the carbon-chlorine bond (C—Cl), the carbon-oxygen bond (C—O), the ester bond (R—COO—R), the ether bond (C—O—C) and the benzene ring, if the resin material layer has a thickness equal to or greater than 10 µm, this results in high emissivity intensity for the atmospheric window, so that the situation of the output of radiative cooling being greater than the input of solar light can be created.

In short, according to the still further characterizing feature of the radiative cooling device of the present invention, in the case of the resin material whose main component is any one of the carbon-fluorine bond (C—F), the carbon-chlorine bond (C—Cl), the carbon-oxygen bond (C—O), the ester bond (R—COO—R), the ether bond (C—O—C) and the benzene ring, the situation of the output of radiative cooling being greater than the input of solar light can be created.

According to a still further characterizing feature of the radiative cooling device of the present invention, the resin material layer has a thickness equal to or less than 20 mm.

Namely, the heat radiation for the atmospheric window of the resin material forming the resin material layer takes place in a range equal to or less than about 100 µm from the surface of the material.

Namely, even when the thickness of the resin material increases, the thickness which contributes to the radiative cooling effect remains the same, the rest of the thickness providing an effect of insulating cold heat after the radiative cooling. If a resin material layer which ideally does not absorb the solar light at all were created, the solar light would be absorbed only by the light reflective layer of the radiative cooling device.

The thermal conductivities of resin materials all range around 0.2 W/m K. Then, if calculation is made with taking such heat conductivities into consideration, when the thickness of the resin material layer exceeds 20 mm, this results in rise in the temperature of the cooling surface (the surface opposite to the presence side of the resin material layer of the light reflective layer). Even if there were an ideal resin material that does not absorb the solar light at all, as the heat conductivity of a resin material ranges generally around 0.2 W/m K, it becomes impossible to cool a cooling target to be cooled by the cooling surface, with the heat radiation (radiative cooling) of the resin material layer and the cooling target will be heated as receiving the sunshine. For this reason, the membrane thickness cannot be equal to or greater than 20 mm.

In short, according to the still further characterizing feature of the radiative cooling device of the present invention, the cooling target can be cooled appropriately.

According to a still further characterizing feature of the radiative cooling device of the present invention, the resin material forming the resin material layer comprises a fluororesin or silicone rubber.

Namely, the fluororesin having the carbon-fluorine bond (C—F) as the main constituent thereof, namely, polytetrafluoroethylene (PTFE), polychlorotrifluoroethylne (PCTFE), polyvinylidene fluoride (PVDF), polyvinyl fluoride (PVF), perfluoroalkoxy fluororesin (PFA) and tetrafluoroethylne/hexafluoropropylne copolymer (FEPP) have little light absorption for the ultraviolet range, visible light range and near infrared range of the solar light spectrum.

Also, a resin having the siloxane bond as the main chain and a side chain having a small molecular weight, i.e. silicone rubber, like the fluororesin, has little light absorption for the ultraviolet range, visible light range and near infrared range of the solar light spectrum.

The thermal conductivity of fluororesin and silicone rubber is 0.2 W/m K. From this viewpoint, these resins, even when the thickness is increased to 20 mm, provide the radiative cooling function.

In short, according to the still further characterizing feature of the radiative cooling device of the present invention, in case the resin material forming the resin material layer comprises a fluororesin or silicone rubber, the radiative cooling function can be provided appropriately.

According to a still further characterizing feature of the radiative cooling device of the present invention:
   the resin material forming the resin material layer comprises a resin having, as the main chain thereof, hydrocarbon having one or more of the carbon-chlorine bond, the carbon-oxygen bond, the ester bond, the ether bond and the benzene ring, or silicone resin in which hydrocarbon as the side chain thereof has a carbon number equal to or greater than 2 (two); and
   the resin material layer has a thickness equal to or less than 500 μm.

In case the resin material forming the resin material layer comprises a resin having, as the main chain thereof, hydrocarbon having one or more of the carbon-chlorine bond (C—F), the carbon-oxygen bond (C—O), the ester bond (R—COO—R), the ether bond (C—O—C) and the benzene ring or silicone resin in which hydrocarbon as the side chain thereof has a carbon number equal to or greater than 2 (two), in addition to the ultraviolet radiation absorption by the covalently bonded electron, there appears absorption due to vibration such as bending and stretching of the bond in the near infrared region.

Specifically, absorptions due to the reference tones of transitions to the first excited states of $CH_3$, $CH_2$, CH appear in the wavelengths from 1.6 μm to 1.7 μm, the wavelength from 1.65 μm to 1.75 μm, and at the wavelength of 1.7 μm respectively. Further, absorption of the combination (resultant) tone of $CH_3$, $CH_2$, CH by the reference tone appears in the wavelength of 1.35 μm, the wavelength of 1.38 μm, and the wavelength of 1.43 μm, respectively. Further, the harmonics of transitions of $CH_2$ and CH to the second excited state appear around the wavelength of 1.24 μm, respectively. The reference tones of bending and stretching of the C—H bond are distributed in the wide range from 2 μm to 2.5 μm wavelength. Further, in case of having such structural formula as $R_1$-$CO_2$-$R_2$, large light absorption is present around 1.9 μm wavelength.

For example, polymethylmethacrylate resin, ethyleneterephthalate resin, polytrimethylene terephthalate, polybutylene terephthalate, polyethylene naphthalate, and polybutylene naphthalate and polyvinyl chloride exhibit similar light absorption characteristics due to $CH_3$, $CH_2$, CH, regarding the near infrared range. When the thicknesses of these resin materials are increased to 20 mm which was defined from the viewpoint of thermal conductivity, they will absorb the near infrared rays included in the solar light, thus being heated. Therefore, in the case of using these resin materials, it is necessary to set the thickness to equal to or less than 500 μm.

In short, according to the still further characterizing feature of the radiative cooling device of the present invention, in case the resin material forming the resin material layer comprises a resin having, as the main chain thereof, a hydrocarbon having one or more of the carbon-chlorine bond, the carbon-oxygen bond, the ester bond, the ether bond and the benzene ring, or silicone resin in which hydrocarbon as the side chain thereof has a carbon number equal to or greater than 2 (two), absorption of near infrared rays can be suppressed.

According to a still further characterizing feature of the radiative cooling device of the present invention:
   the resin material forming the resin material layer comprises blend of a resin having the carbon-chlorine bond or the siloxane bond and a resin having a hydrocarbon as the main chain thereof; and
   the thickness of the resin material layer is equal to or less than 500 μm.

Namely, in case the resin material forming the resin material layer comprises blend of a resin, having as the main chain thereof, the carbon-chlorine bond (C—F) or the siloxane bond (Si—O—Si) and a resin having the main chain thereof a hydrocarbon, in accordance with the ratio of the blended resin having a hydrocarbon as the main chain thereof, there appears light absorption of the near infrared range due to CH, $CH_2$, $CH_3$, etc. In case the carbon-fluorine bond or the siloxane bond constitutes the main component, since the light absorption of the near infrared range due to the hydrocarbon is smaller, so that it is possible to increase the thickness to the upper limit of 20 mm from the viewpoint of thermal conductivity. However, in case the blended hydrocarbon constitutes the main component, it is necessary to set the thickness to equal to or less than 500 μm.

The blend of fluororesin or silicone rubber with hydrocarbon includes one in which the side chain of fluororesin or silicone rubber is substituted with hydrocarbon, alternate copolymer, random copolymer, block copolymers and graft copolymers of fluorine monomer and silicone monomer and hydrocarbon monomer. Incidentally, as examples of alternate copolymer of fluorine monomer and hydrocarbon monomer, fluoroethylene vinyl ester (FEVE), fluoroolefin-acrylic acid ester copolymer, ethylene/tetrafluoroethylene copolymer (ETFE), ethylene/chlorotrifluoroethylene copolymer (ECTFE) can be cited.

In accordance with the molecular weight and the ratio of the hydrocarbon side chain to be substituted, the light absorption of the near infrared range due to CH, $CH_2$, $CH_3$, etc. appears.

In case the monomer to be introduced as a side chain or copolymer has a low molecular weight or the introduced monomer has low density, the light absorption of the near infrared range due to hydrocarbon becomes smaller, so that the thickness can be increased to 20 mm which is the limit from the viewpoint of heat conductivity.

In case a side chain of fluororesin or silicone rubber or hydrocarbon having a high molecular weight as a monomer to be copolymerized is introduced, it is necessary to set the thickness of the resin to equal to or less than 500 μm.

In short, according to the still further characterizing feature of the radiative cooling device of the present invention, in case the resin material forming the resin material layer comprises blend of a resin having a hydrocarbon as the main chain thereof and a resin having the carbon-chlorine bond or the siloxane bond as the main chain thereof, the absorption of the near infrared rays can be suppressed.

According to a still further characterizing feature of the radiative cooling device of the present invention:
   the resin material forming the resin material layer comprises fluororesin; and
   the thickness of the resin material layer is equal to or less than 300 μm.

Namely, from the viewpoint of utility of the radiative cooling device, the smaller the thickness of the resin material layer, the better. The thermal conductivity of resin material is generally lower than those of metals or glass. In order to cool a cooling target effectively, the membrane thickness of the resin material layer should be set to the necessary minimal. With increase of the membrane thickness of the resin material layer, heat radiation for the atmospheric window increases. And, when it exceeds a certain membrane thickness, the thermal radiation energy of the atmospheric window become saturated.

Respecting the membrane thickness of the resin material layer which results in saturation, the saturation will occur with sufficiently high likelihood when it is not more than 300 µm approximately in the case of fluororesin. Therefore, it is desirable to limit the membrane thickness of the resin material layer to equal to or less than 300 µm, rather than 500 µm, from the viewpoint of thermal conductivity.

Incidentally, although the saturation of heat radiation has not occurred yet, even if the thickness is only about 100 µm, sufficient heat radiation for the atmospheric window range can be obtained. When the thickness is smaller, the heat transmission coefficient becomes greater, so that the temperature of the cooling target can be reduced more effectively. Thus, in the case of fluororesin for instance, the thickness may be set to 100 µm approximately.

Further, in the case of fluororesin, the absorption coefficient due to the carbon-silicon bond, the carbon-chlorine bond, the carbon-oxygen bond, the ester bond and the ether bond is greater than the absorption coefficient due to the C—F bond. Needless to say, from the viewpoint of thermal conductivity, desirably, the thickness should be set to equal to or less than 300 µm, rather than 500 µm. However, even higher radiant cooling effect can be expected with increase of the heat conductivity through further reduction in the membrane thickness.

By the way, as an example of the fluororesin, polyvinyl fluoride (PVF) and vinylidene fluoride (PVDF) can be used advantageously.

In short, according to the still further characterizing feature of the radiative cooling device of the present invention, improvement of the radiative cooling effect is made possible in case the resin material comprises fluororesin.

According to still further characterizing feature of the radiative cooling device of the present invention:
the resin material forming the resin material layer comprises a resin material having at least one or more of the carbon-chlorine bond, the carbon-oxygen bond, the ester bond, the ether bond and the benzene ring; and
the thickness of the resin material layer is equal to or less than 50 µm.

Namely, in the case of a resin material having the carbon-chlorine bond, the carbon-oxygen bond, the ester bond, the ether bond and the benzene ring, even when its thickness is 100 µm, the heat radiation energy for the atmospheric window is saturated, so sufficient radiative cooling effect for the atmospheric window can be obtained even with thickness of 50 µm.

When the thickness of the resin material is smaller, the heat transmission coefficient becomes greater, so that the temperature of the cooling target can be reduced more effectively. Therefore, in the case of a resin material having the carbon-chlorine bond, the carbon-oxygen bond, the ester bond, the ether bond and the benzene ring, with thickness equal to or less than 50 µm, the heat insulation becomes smaller, and the cooling target can be cooled effectively.

The advantage of thickness reduction is not limited to the possibility of heat insulation for bettering conduction of cold heat. Another advantage is suppression of light absorption in near infrared range due to CH, $CH_2$, $CH_3$ in the near infrared range exhibited by such resin having the carbon-chlorine bond, the carbon-oxygen bond, the ester bond, the ether bond. With thickness reduction, the solar light absorption by these can be reduced, so that the cooling capacity of the radiative cooling device is enhanced.

For the above-described viewpoint, in the case of a resin material having the carbon-chlorine bond, the carbon-oxygen bond, the ester bond, the ether bond and the benzene ring, with thickness equal to or less than 50 µm, the radiant cooling effect can be achieved more effectively under sunshine.

In short, according to the still further characterizing feature of the radiative cooling device of the present invention, in the case of a resin material having one or more of the carbon-chlorine bond, the carbon-oxygen bond, the ester bond, the ether bond and the benzene ring, improvement of the radiative cooling effect is made possible.

According to still further characterizing feature of the radiative cooling device of the present invention:
the resin material forming the resin material layer comprises a resin material having the carbon-silicon bond; and
the thickness of the resin material layer is equal to or less than 10 µm.

Namely, in the case of a resin material having the carbon-silicon bond, even when its thickness is 50 µm, the heat radiation energy for the atmospheric window is saturated, so sufficient radiative cooling effect for the atmospheric window can be obtained even with thickness of 10 µm. When the thickness of the resin material is smaller, the heat transmission coefficient becomes greater, so that the temperature of the cooling target can be reduced more effectively. Therefore, in the case of a resin material having the carbon-silicon bond, with thickness equal to or less than 10 µm, the heat insulation becomes smaller, and the cooling target can be cooled effectively. With thickness reduction, the solar light absorption can be reduced, so that the cooling capacity of the radiative cooling device is enhanced.

Form the above-described viewpoint, in the case of a resin material having the carbon-silicon bond, with thickness equal to or less than 10 µm, the radiant cooling effect can be achieved more effectively under sunshine.

In short, according to the still further characterizing feature of the radiative cooling device of the present invention, in the case of a resin material having the carbon-silicon bond, improvement of the radiative cooling effect is made possible.

According to still further characterizing feature of the radiative cooling device of the present invention:
the resin material forming the resin material layer comprises vinyl chloride resin or vinylidene chloride resin; and
the thickness of the resin material layer is equal to or less than 100 µm and equal to or greater than 10 µm.

Namely, with vinyl chloride resin or vinylidene chloride resin whose thickness is equal to or less than 100 µm and equal to or greater than 10 µm, sufficient heat radiation can be obtained for the atmospheric window range.

Although vinyl chloride resin or vinylidene chloride resin is slightly inferior to fluororesin having such heat radiation characteristics that allows a large heat radiation to be obtained in the atmospheric window range, it is still superior to other resin materials such as silicone rubber and it is less expensive than fluororesin also. Thus, it is advantageous for inexpensively configuring a radiative cooling device that provides reduction of temperature from the surrounding temperature under direct sunshine.

Moreover, since vinyl chloride resin or vinylidene chloride resin in the form of a thin membrane is soft, it is more resistant against a scratch even in the event of accidental contact with an object, so it can maintain good aesthetic appearance for a long time. On the other hand, fluororesin in the form of a thin membrane is hard, so a scratch can be readily formed therein in the event of accidental contact with an object, so it cannot maintain good aesthetic appearance for a long time.

In short, according to the still further characterizing feature of the radiative cooling device of the present invention, it is possible to inexpensively configure a radiative cooling device that provides reduction of temperature from the surrounding temperature under direct sunshine and that is resistant against scratch also.

According to a still further characterizing feature of the radiative cooling device of the present invention, the light reflective layer is formed of silver or silver alloy and has a thickness equal to or greater than 50 nm.

Namely, in order to provide the light reflective layer with the reflectance characteristics that provides a reflectance equal to or greater than 90% for 0.4 μm to 0.5 μm wavelength and a reflectance equal to or greater than 96% for longer wavelengths than 500 nm, the reflective material of the radiative surface of the light reflective layer needs to be silver or silver alloy.

And, in case silver or silver alloy alone provides the above-described reflectance characteristics for reflecting the solar light, a thickness equal to or greater than 50 nm is needed.

In short, according to the still further characterizing feature of the radiative cooling device of the present invention, it is possible to reliably suppress the solar light absorption by the light reflective layer, to carry out the radiative cooling by the resin material layer favorably.

According to a still further characterizing feature of the radiative cooling device of the present invention, the light reflective layer comprises a stacked structure of silver or silver alloy and aluminum or aluminum alloy.

Namely, in order to provide the light reflective layer with the above-described reflectance characteristics, this may comprise a stacked structure of silver or silver alloy and aluminum or aluminum alloy. Incidentally, in this case too, the reflective material of the radiative surface needs to be silver or silver alloy. In this case, the thickness of silver needs to be equal to or greater than 10 nm, and the thickness of aluminum needs to be equal to or greater than 30 nm And, since aluminum or aluminum alloy is less expensive than silver or silver alloy, it is possible to provide the light reflective layer inexpensively while providing it with the appropriate reflectance characteristics.

Namely, while reducing the thickness of expensive silver or silver alloy for achieving cost reduction of the light reflective layer, with use of the stacked structure of silver or silver alloy and aluminum or aluminum alloy, cost reduction of the light reflective layer is made possible with providing it with the appropriate reflectance characteristics.

In short, according to the still further characterizing feature of the radiative cooling device of the present invention, cost reduction of the light reflective layer is made possible with providing it with the appropriate reflectance characteristics.

According to a still further characterizing feature of the radiative cooling device of the present invention, the resin material layer and the light reflective layer are stacked and formed like a film.

Namely, the resin material layer and the light reflective layer are stacked and formed like a film. That is, the radiative cooling device comprising a resin material layer and a light reflective layer stacked is produced as a radiative cooling film. Moreover, as the resin material layer has flexibility, the radiative cooling device (radiative cooling film) is provided with flexibility also.

Therefore, the radiative cooling device in the form of a film (radiative cooling film) and having flexibility can be retrofitted to e.g. an exterior wall of an existing outdoor facility for providing the radiative cooling effect thereto advantageously.

Incidentally, in order to produce the radiative cooling device (radiative cooling film) in the form of a film, various modes are conceivable. For instance, it is conceivable to produce it by applying the resin material layer to a light reflective layer which was produced in advance in the form of a film. Alternatively, it is conceivable to produce it by bonding or affixing the resin material layer to the light reflective layer which was produced in advance in the form of a film. Further alternatively, on the resin material layer produced in advance in the form of a film, a light reflective layer may be produced by such technique as vapor deposition, sputtering, ion plating, silver mirror reaction, etc.

In short, according to the still further characterizing feature of the radiative cooling device of the present invention, by retrofitting it to an existing facility, the radiative cooling capacity can be provided thereto advantageously.

A radiative cooling method of the present invention is a radiative cooling method that uses a radiative cooling device having any one of the above-described characterizing features for radiating the infrared light from the radiative surface of the resin material layer on the side opposite to the side contacting the light reflective layer, the method being characterized in that:

the radiative surface is oriented toward the sky for radiating the infrared light from the radiative surface.

With the above-described arrangement, as the infrared light released from the radiative surface to the outside of the system is radiated toward the sky, so that it may be released into the sky, i.e. the outer space. Further, through suppression of solar light absorption, the cooling capacity can be improved.

In short, according to the still further characterizing feature of the radiative cooling device of the present invention, the cooling capacity can be improved with effective suppression of light absorption of the solar light.

BRIEF DESCRIPTION OF THE DRAWINGS

FIG. 14 is a view showing experiment results, FIG. 15 is a view showing a specific arrangement of a radiative cooling device, FIG. 16 is a view showing a specific arrangement of a radiative cooling device, FIG. 19 is a view showing emissivity spectrum of vinylidene chloride resin.

DESCRIPTION OF THE INVENTION

Next, the present invention will be explained with reference to the accompanying drawings.

[Basic Arrangement of Radiative Cooling Device]

Figure 1:
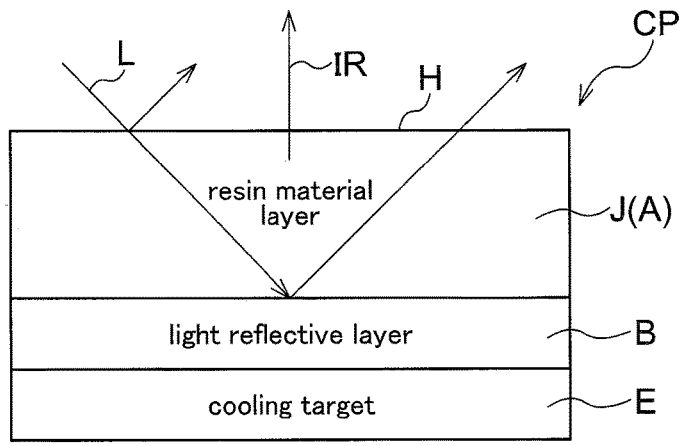
FIG. 1 is a view explaining a basic arrangement of a radiative cooling device.

As shown in FIG. 1, a radiative cooling device CP comprises an infrared radiative layer A for radiating infrared light (infrared radiation) IR from a radiative surface H thereof and a light reflective layer B disposed on the side opposite to the presence side of the radiative surface H of the infrared radiative layer A are disposed in a mutually stacked state and is produced in the form of a film.

Namely, the radiative cooling device CP is configured as a radiative cooling film.

The light reflective layer B is provided for reflecting light L of e.g. solar light transmitted through the infrared radiative layer A and has reflectance characteristics that provides a reflectance of 90% or higher for 400 nm (0.4 μm) to 500 nm (0.5 μm) wavelength and a reflectance of 96% or higher for longer wavelengths longer than 500 nm.

Figure 10:
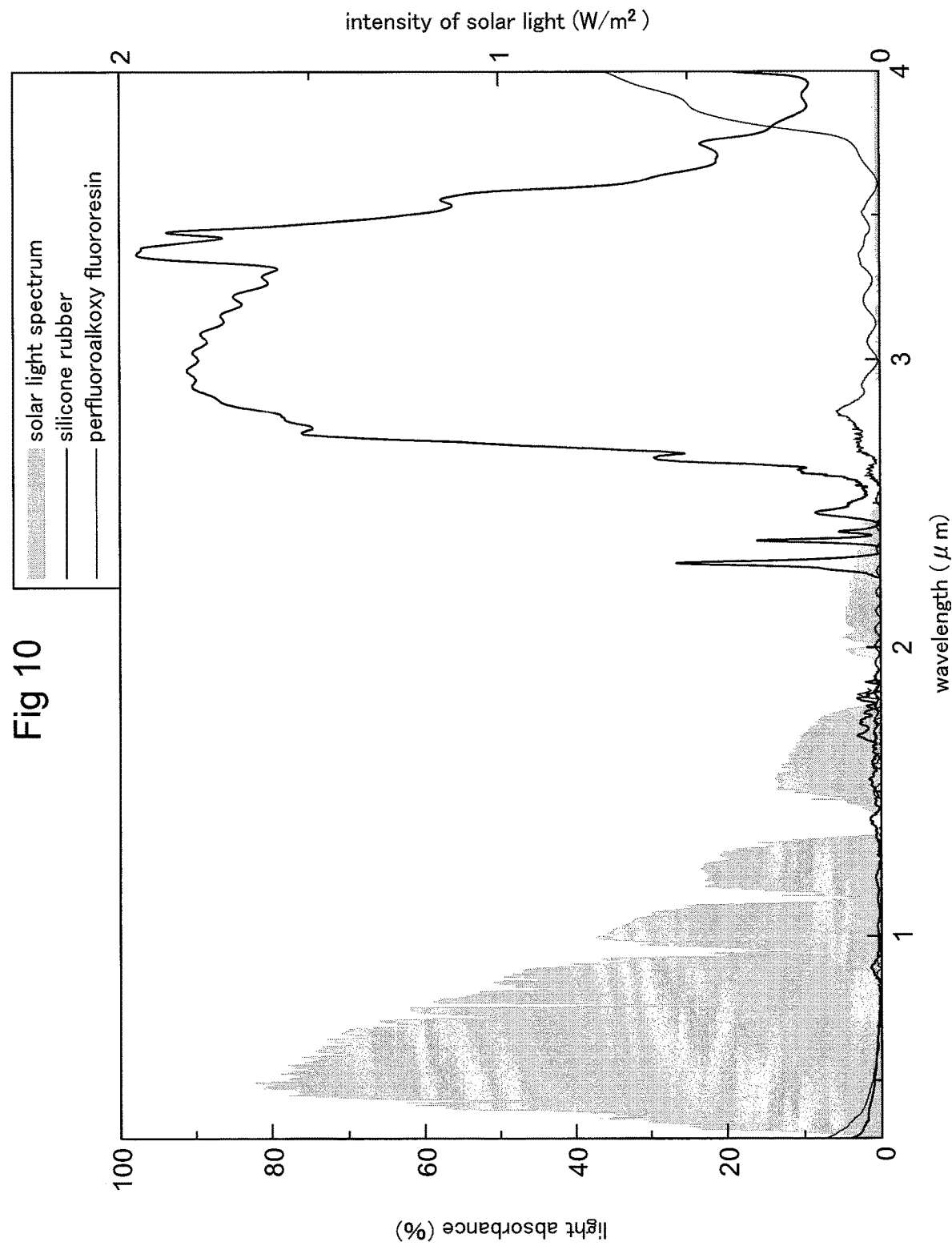
FIG. 10 is a view showing light absorbance spectra of silicone rubber and perfluoroalkoxy fluororesin.

The solar light spectrum, as shown in FIG. 10, is present from 300 nm to 4000 nm wavelength and its intensity increases as the wavelength increases from 400 nm wavelength and the intensity is particularly high for 500 nm to 1800 nm wavelength.

Incidentally, in the instant embodiment, what is referred to as "light" L is understood to be inclusive of ultraviolet light, visible light and infrared light; and in terms of the light wavelengths of these as electromagnetic waves, it includes electromagnetic waves having the wavelengths ranging from 10 nm to 2000 nm (electromagnetic waves from 0.01 μm to 20 μm).

As the light reflective layer B exhibits a reflectance of 90% or higher for 400 nm to 500 nm wavelength and a reflectance of 96% or higher for longer wavelengths longer than 500 nm wavelength, the radiative cooling device CP (radiative cooling film) can suppress the solar light energy absorbed by the light reflective layer B to about 5% or less (equal to or less than 5%). Namely, it can make the absorbed solar light energy at the time of meridian passing in summer time to about 50 W.

The light reflective layer B is formed of silver or silver alloy or is formed as a stacked structure of silver or silver alloy and aluminum or aluminum alloy, thus having flexibility. The details of this will be described later.

The infrared radiative layer A is constituted as a resin material layer J whose thickness is adjusted to release heat radiation energy greater than absorbed solar light energy in the range from 8 μm to 14 μm wavelength. The details of this will be described later.

Thus, the radiative cooling device CP is configured to reflect a part of the light L incident on the radiative cooling device CP by the radiative surface H of the infrared radiative layer A and reflect the light (solar light, etc.) transmitted through the resin material layer J of the light L incident on the radiative cooling device CP by the light reflective layer B to release it from the radiative surface H to the outside.

And, as the heat input (e.g. heat input by heat conduction from a cooling target E) to the radiative cooling device CP from the cooling target E located on the side opposite to the presence side of the resin material layer J of the light reflective layer B is converted into infrared light (infrared radiation or infrared rays) IR by the resin material layer J to be radiated as such, thus cooling the cooling target E.

Namely, the radiative cooling device CP is configured such that the light L irradiated onto this radiative cooling device CP is reflected and also the heat transferred to this radiative cooling device CP (e.g. heat transferred from the atmosphere, the heat transferred from the cooling target E) is radiated as the infrared light IR to the outside.

Further, as the resin material layer J and the light reflective layer B have flexibility, the radiative cooling device CP (radiative cooling film) is also provided with flexibility.

In addition, the radiative cooling device CP is employed for implementing a radiative cooling method in which the infrared light IR is radiated from the radiative surface H on the side opposite to the side of the resin material layer J placed in contact with the light reflective layer B. Specifically, by orienting the radiative surface H toward the sky, the radiative cooling method is implemented for radiating the infrared light IR from the radiative surface H toward the sky.

[General Arrangement of Resin Material Layer]

The resin material forming the resin material layer J has its light absorbance and emissivity (light emissivity) varying with its thickness. For this reason, it is necessary to adjust the thickness of the resin material layer J so that it may absorb as little as possible solar light and it may exhibit large heat radiation in the wavelength range of the so-called atmospheric window (the range from 8 μm to 14 μm wavelength).

More particularly, from the viewpoint of solar light absorbance, it is necessary to adjust the thickness of the resin material layer J such that the wavelength average of light absorbance from 0.4 μm to 0.5 μm wavelength may be equal to or less than 13%, the wavelength average of light absorbance from 0.5 μm to 0.8 μm wavelength may be equal to or less than 4%, the wavelength average of light absorbance from 0.8 μm to 1.5 μm wavelength may be equal to or less than 1%, the wavelength average of light absorbance from 1.5 μm to 2.5 μm wavelength may be equal to or less than 40%, and the wavelength average of light absorbance from 2.5 μm to 4 μm wavelength may be equal to or less than 100%.

In the case of absorbance distribution described above, the light absorbance for solar light becomes equal to or less than 10%, which is equal to or less than 100 W in terms of energy.

As will be described later, the light absorbance of the resin material increases with increase of the membrane thickness of the resin material. And, when the resin material is formed as a thick membrane, the emissivity of the atmospheric window becomes substantially 1 (one) and the heat radiation released to the outer space will become from 125 W/m² to 160 W/m². The solar light absorbance by the light reflective layer B is equal to or less than 50 W/m². If the sum of the solar light absorbance by the resin material layer J and the solar light absorbance by the light reflective layer B is equal to or less than 150 W/m² and the condition of the atmosphere is favorable, then, the cooling effect will be developed. As the resin material for forming the resin material layer J, it is advantageous to employ a material that has a low light absorbance in the vicinity of the peak value of the solar light spectrum as described above.

Further, the thickness of the resin material layer J, from the viewpoint of the infrared radiation (heat radiation) needs to be adjusted to such thickness that provides a wavelength average of 40% or higher in the emissivity from 8 μm to 14 μm wavelength.

In order to allow about 50 W/m² of heat energy of solar light absorbed by the light reflective layer B to be released into the outer space from the resin material layer J through heat radiation from the resin material layer J, a greater amount of heat radiation needs to be outputted by the resin material layer J.

For instance, the heat radiation of the atmospheric window from 8 μm to 14 μm at the time of the outside temperature of 30° C. is 200 W/m² at maximum (calculated on the premise of emissivity of 1 (one)). This value is obtained when the weather is fair in a dry environment with thin air such as on a high mountain or the like. In a lowland or the like, the thickness of the atmosphere is greater than on a high mountain, so the wavelength range of the atmospheric window is narrower and the transmittance is lower. This phenomenon is referred to as "atmospheric window narrows. (narrowing of atmospheric window)".

Moreover, the environment in which the radiative cooling device CP (radiative cooling film) is actually used can have high humidity. In this case too, the atmospheric window narrows. Heat radiation generated in the range of atmospheric winder in the case of use in a lowland is estimated to be 160 W/cm² at 30° C., when the conditions are good (calculated based on a premise of emissivity being 1). Further, as it often happens in Japan, when there exits mist or smog in the sky, the atmospheric window will further narrow and the radiation into the outer space will become 125 W/m² approximately.

In view of the above-described situations, use in a land of mid altitude is not possible unless the wavelength average of the emissivity from 8 μm to 14 μm is equal to or greater than 40% (emissivity of heat radiation intensity in the atmospheric window range is 50 W/m²).

Therefore, by adjusting the thickness of the resin material layer J to the above-described range of optical standard, the heat output of the atmospheric window becomes greater than the heat input by the light absorption of the solar light, and radiative cooling effect can be provided even outdoors under solar irradiated environment in daytime.

[Details of Resin Material]

As the resin material, it is possible to employ a colorless resin material that includes the carbon-fluorine bond (C—F), the siloxane bond (Si—O—Si), the carbon-chlorine bond (C—Cl), the carbon-oxygen bond (C—O), the ester bond (R—COO—R), the ether bond (C—O—C) or the benzene ring.

Figure 2:
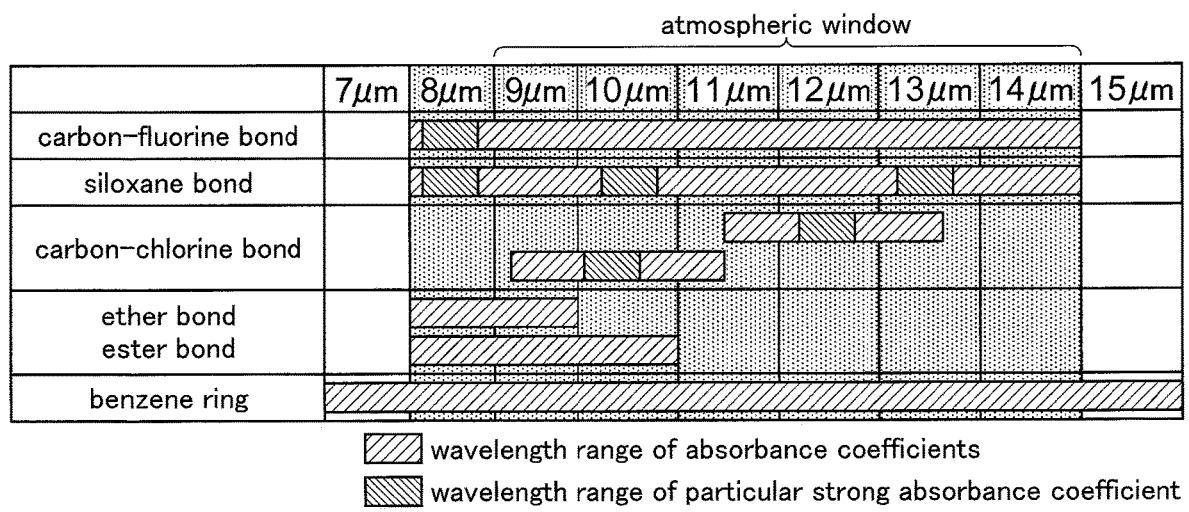
FIG. 2 is a view showing relation between absorption coefficient and wavelength range of resin material.

Regarding the respective resin materials (excluding the carbon-oxygen bond), the wavelength ranges having absorption coefficients in the wavelength range of the atmospheric window are shown in FIG. 2.

According to the Kirchhoff's laws, the emissivity (ε) and the light absorbance (A) are equal. The light absorbance (A) can be obtained from the absorption coefficient (a) by following the relational expression (to be referred to as the "light absorption relational expression" hereinafter): $A=1-\exp(-\alpha t)$, where t denotes the membrane thickness.

Namely, with adjustment of the membrane thickness of the resin material layer J, a greater heat radiation can be obtained in a wavelength range having high absorption coefficients. In case radiative cooling is implemented outdoors, it is advantageous to employ a material having high absorption coefficient in the wavelength ranging from 8 μm to 14 μm which is the wavelength range of the atmospheric window.

Also, for the sake of suppression of solar light absorption, it is advantageous to employ a material that has no or only small absorption coefficient in the wavelength ranging from 0.3 μm to 4 μm, in particular, from 0.4 μm to 2.5 μm. As may be understood from the relational expression of the absorption coefficient and the absorbance described above, the light absorbance (emissivity) varies with membrane thickness of the resin material layer.

In order to lower the temperature than the surrounding atmosphere by radiative cooling in solar irradiated environment, with selection of a material that has a high absorption coefficient in the wavelength range of the atmospheric window and that also has almost no absorption coefficient in the wavelength range of solar light, through adjustment of the membrane thickness of the resin material layer, it is possible to create a condition in which the solar light is hardly absorbed, but high heat radiation of the atmospheric window is produced, namely, the output of the radiative cooling is greater than the input of solar light.

Regarding the carbon-fluorine bond (C—F), the absorption coefficients due to CHF and $CF_2$ are distributed largely in the wide range from 8 μm to 14 μm wavelength which is the atmospheric window, and the absorption coefficient is particularly high at 8.6 μm. Also, respecting the wavelength range of the solar light, no distinct absorption coefficient is found at the wavelength of 0.3-2.5 μm where the energy is large.

As examples of resin materials having the C—F bond, there are cited:

polytetrafluoroethylene (PTFE) which is a fully fluorinated resin;

polychlorotrifluoroethylene (PCTFE), polyvinylidene fluoride (PVDF) and polyvinyl fluoride (PVF), which are partially fluorinated resins;

perfluoroalkoxy fluororesin (PFA) which is a fluororesin copolymer;

tetrafluoroethylene/hexafluoropropylene copolymer (FEP);

ethylene/tetrafluoroethylene copolymer (ETFE); and ethylene-chlorotrifluoroethylene copolymer (ECTFE).

As examples of resin material having the siloxane bond (Si—O—Si), silicone rubber and silicone resin can be cited.

With these resins, large absorption coefficients due to stretching of the C—Si bond appear broadly centering about 13.3 μm wavelength and the absorption coefficients due to symmetric out-of-plane bending vibration (wagging) of $CSiH_2$ appears broadly centering about 10 μm wavelength and symmetric in-plane bending vibration (scissoring) of $CSiH_2$ appear small in the vicinity of 8 μm wavelength.

Regarding the carbon-chlorine bond (C—Cl), the absorption coefficients due to C—Cl stretching vibration appear in a wide range having 1 μm halfwidth centering about 12 μm wavelength.

And, as the resin materials, polyvinyl chloride (PVC) and polyvinylidene fluoride (PVDF) are cited. In the case of polyvinyl chloride, due to the influence of electron absorption by chlorine, absorption coefficient due to the C—H bending vibration of alkene contained in the main chain appears around 10 μm wavelength.

Regarding the ester bond (R—COO—R) and the ether bond (C—O—C bond), these have absorption coefficients from 7.8 μm to 9.9 μm wavelength. Further, regarding the carbon-oxygen bond included in the ester bond and ether bond, strong absorption coefficients appear from 8 μm to 10 μm wavelength.

If a benzene ring is introduced to the side chain of hydrocarbon, due to the vibration of the benzene ring per se or the vibration of surrounding elements by the influence of the benzene ring, absorption will appear broadly from 8.1 μm to 18 μm wavelength.

As examples of reins having these bonds, methyl methacrylate resin, ethyleneterephthalate resin, trimethylene terephthalate resin, butylene terephthalate resin, ethylene naphthalate resin, butylene naphthalate resin can be cited.

[Study of Light Absorption]

Next, the light absorptions in the ultraviolet-infrared range of the resin materials having the above-described bonds or the functional group, namely, solar light absorptions, will be studied. The absorption of light from the ultraviolet to the visible range is attributable to transition of electrons contributing to the bonds. The absorptions in this wavelength range can be found by calculation of the bonding energies.

Firstly, study will be made on the wavelengths for which the resin materials having the carbon-fluorine bond (C—F) provide absorption coefficients in the range from the ultraviolet to visible range. Bonding energies of the C—C bond, C—H bond and C—F bond in the basic structure portion represented by polyvinylidene fluoride (PVDF) are obtained respectively as 4.50 eV, 4.46 eV and 5.05 eV, which correspond respectively to 0.275 μm wavelength, 0.278 μm wavelength and 0.246 μm wavelength, and the light on the shorter wavelength side than these wavelengths is absorbed.

The solar light spectrum exists only on the wavelength longer than 0.300 μm wavelength. So, when a fluorine resin is employed, the ultraviolet rays, the visible rays and the near infrared rays are hardly absorbed. Incidentally, the ultraviolet rays are defined as the range of wavelengths shorter than 400 μm, the visible rays are defined as the range of wavelength from 0.400 μm to 0.800 μm, the near infrared rays are defined as the range of wavelength from 0.800 μm to 3 μm, and the mid-infrared rays are defined as the range of wavelength from 3 μm to 8 μm, and the far infrared rays are defined as the range of wavelength longer than 8 μm, respectively.

Figure 3:
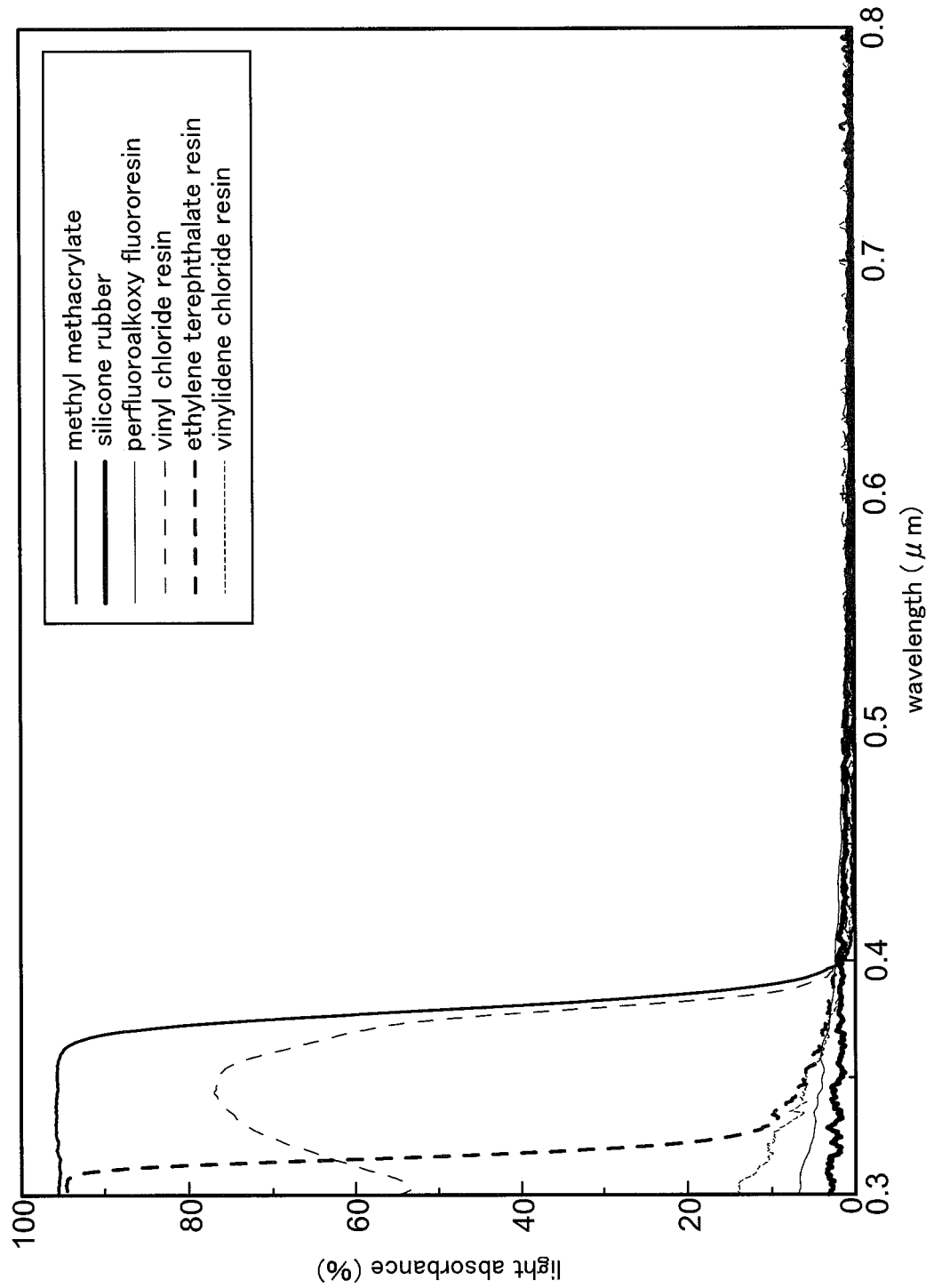
FIG. 3 is a view showing relation between light absorbance and wavelength of resin material.

The absorbance spectrum in the ultraviolet to visible range of PFA (perfluoroalkoxy fluororesin) having 50 μm thickness is shown in FIG. 3, from which it may be understood that it has almost no absorbance. Incidentally, although slight increase of absorbance spectrum is seen on the shorter wavelength side than 0.4 μm, this increase merely represents influence of scattering of a sample employed in the determination, in actuality, there is no increase in the absorbance.

Regarding the ultraviolet range of the siloxane bond (Si—O—Si), the bonding energy of Si—O—Si of the main chain is 4.60 eV, which corresponds to 269 nm wavelength. As the solar light spectrum exists for the longer wavelengths than 0.300 μm wavelength, in case most of the bonds are the siloxane bond, the ultraviolet rays, the visible rays, near infrared rays of the solar light are hardly absorbed.

The absorbance spectrum in the ultraviolet to visible range of silicone rubber having 100 μm thickness is shown in FIG. 3, from which it may be understood that it has almost no absorbance. Incidentally, although slight increase of absorbance spectrum is seen on the shorter wavelength side than 0.4 μm, this increase merely represents influence of scattering of a sample employed in the determination, in actuality, there is no increase in the absorbance.

Regarding the carbon-chlorine bond (C—Cl), the bonding energy of carbon and chlorine of alkene is 3.28 eV, which corresponds to 0.378 μm wavelength. Thus, it absorbs much of the ultraviolet rays included in the solar light, but it hardly absorbs the visible range thereof.

The absorbance spectrum in the range from ultraviolet to visible range of vinyl chloride resin having 100 μm thickness is shown in FIG. 3, in which the light absorbance increases on the shorter wavelength side shorter than 0.38 μm wavelength.

The absorbance spectrum in the range from ultraviolet to visible range of vinylidene chloride resin having 100 μm thickness is shown in FIG. 3, in which slight increase in the absorbance spectrum is seen on the shorter wavelength side shorter than 0.4 μm wavelength.

As examples of resin having the ester bond (R—COO—R), the ether bond (C—O—C bond) and the benzene ring, there are methyl methacrylate resin, ethylene terephthalate resin, trimethylene terephthalate resin, butylene terephthalate resin, ethylene naphthalate resin, butylene naphthalate resin. For example, the bonding energy of the C—C bond of acryl is 3.93 eV, thus absorbing the solar light having wavelengths shorter than 0.315 μm wavelength, but has almost no absorbance for the visible range.

As an example of resin materials having such bonds and functional group, FIG. 3 shows the absorbance spectrum in the range from ultraviolet to visible range of methyl methacrylate resin having 5 mm thickness. Incidentally, the methyl methacrylate resin illustrated is a commercially available one, in which benzotriazole-based UV absorbent is mixed.

As it is a thick plate having 5 mm thickness, the wavelength of small absorption coefficients is greater and light absorbance increases on the shorter wavelength side of 0.38 μm wavelength which is longer than 0.315 μm wavelength.

As an example of resin materials having such bonds and functional group, FIG. 3 shows the absorbance spectrum in the range from ultraviolet to visible range of ethylene terephthalate resin having 40 μm thickness. As shown, the absorbance increases as the wavelength approaches 0.315 μm, and the absorbance sharply increases at 0.315 μm wavelength. Incidentally, in the case of ethylene terephthalate resin too, with increase of its thickness, there occurs increase of absorbance at the absorption end due to the C—C bond and the absorbance for ultraviolet rays increases on the wavelength side slightly longer than 0.315 μm, like methyl methacrylate resin, As long as the resin material forming the resin material layer J has the emissivity (light emissivity) and the absorption characteristics, the resin material layer may be a mono-layer membrane of one kind of resin material, a multi-layered membrane of a plurality of kinds of resin material, a mono-layer of a plurality of kinds of resin material blended together or a multi-layered membrane of a plurality of kinds of resin material blended together.

Incidentally, such blends include mutual copolymers, random copolymers, block copolymers, graft copolymers, etc. as well as modified copolymers and modified products with side chains substituted.

[Emissivity of Silicone Rubber]

Figure 4:
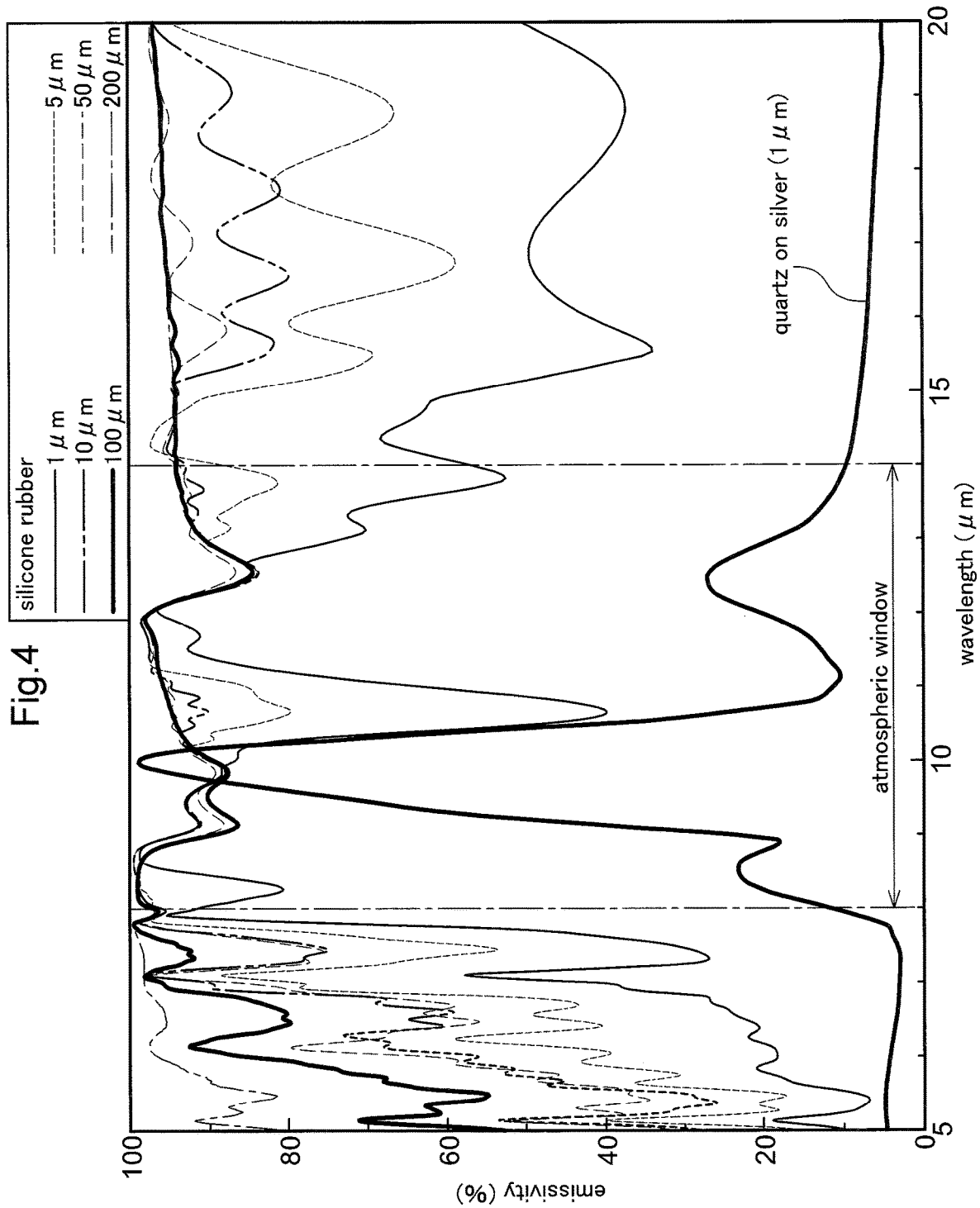
FIG. 4 is a view showing emissivity spectrum of silicone rubber.

FIG. 4 shows emissivity spectrum for the atmospheric window of silicone rubber having the siloxane bond.

From the silicone rubber, large absorption coefficients due to stretching of the C—Si bond appear broadly around 13.3μ wavelength, the absorption coefficients due to symmetric out-of-plane bending vibration (wagging) of $CSiH_2$ appears broadly centering about 10 μm wavelength and symmetric in-plane bending vibration (scissoring) of $CSiH_2$ appears small in the vicinity of 8 μm wavelength.

Due to the above, the wavelength average of emissivity of 1 μm thickness is 80% in the wavelength range from 8 μm to 14 μm, which is confined within the requirement of 40% or higher average wavelength. As shown, with increase of membrane thickness, the emissivity for the atmospheric window range increases.

By the way, FIG. 4 shows also the radiation spectrum in case quartz, an inorganic substance, having 1 μm thickness is present on silver. When quartz has the thickness of 1 μm, it provides only emissivity peak of a narrow range in the range from 8 μm to 14 μm wavelength.

When these heat emissivity values are averaged for the wavelength range from 8 μm to 14 μm, emissivity of 32% is obtained for the wavelength range from 8 μm to 14 μm, with which it is difficult to provide any radiative cooling capacity.

With the inventive radiative cooling device CP (radiative cooling film) using the resin material layer J, a radiative cooling capacity can be obtained even with a thinner infrared radiative layer A than the conventional technique using an inorganic material as the light reflective layer B.

Namely, in case the infrared radiative layer A is formed of quartz or TEMPAX which is an inorganic material, radiative cooling capacity cannot be obtained when the infrared radiative layer A has a membrane thickness of 1 μm. Whereas, with the inventive radiative cooling device CP using the resin material layer J, the radiative cooling capacity can be obtained even in the case of the resin material layer J having a membrane thickness of 1 μm.

[Emissivity of PFA]

Figure 5:
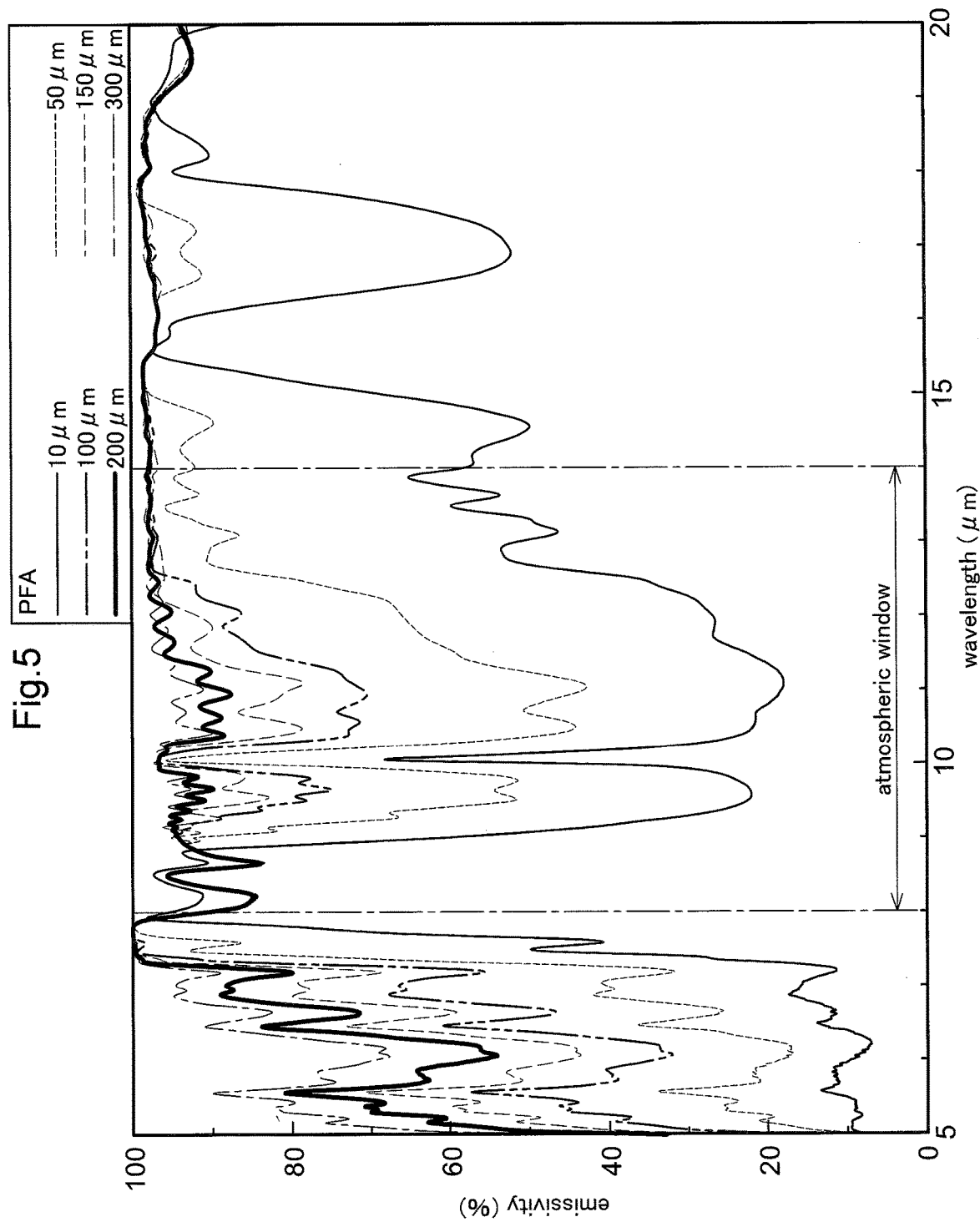
FIG. 5 is a view showing emissivity spectrum of PFA.

FIG. 5 shows the emissivity for the atmospheric window of perfluoroalkoxy fluororesin (PFA) as a representative example of resin having the carbon-fluorine bond. As shown, the absorption coefficients due to CHF and $CF_2$ are distributed widely from the wavelength 8 μm to 14 μm which constitutes the atmospheric window. And, the absorption coefficient is particularly large at 8.6 μm.

Due to the above, the wavelength average of the emissivity at 10 μm thickness is 45% from 8 μm to 14 μm wavelength, which is confined within the requirement of 40% or higher average wavelength. As shown, with increase of membrane thickness, the emissivity for the atmospheric window range increases.

[Emissivity of Vinyl Chloride Resin and Vinylidene Chloride Resin]

Figure 6:
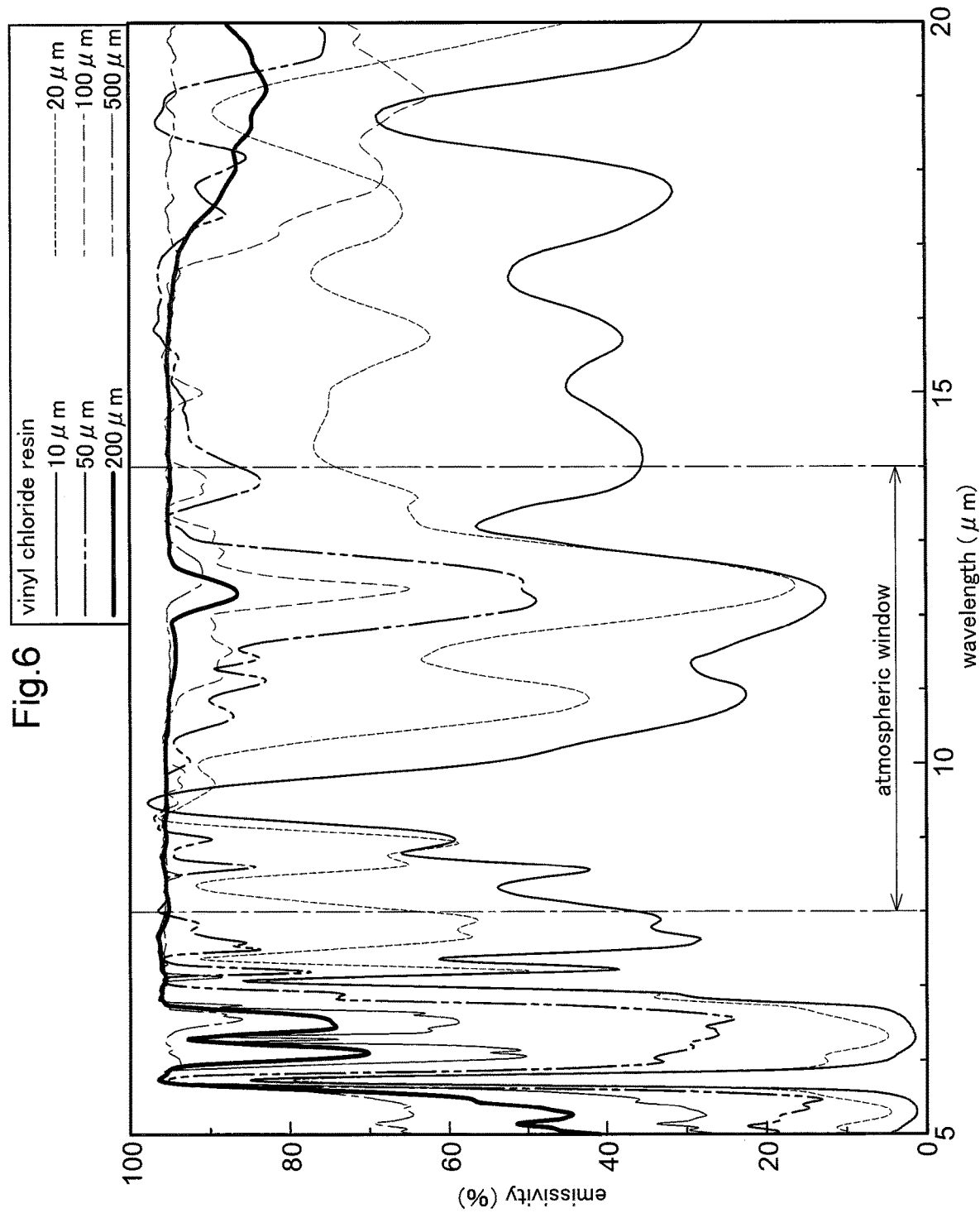
FIG. 6 is a view showing emissivity spectrum of vinyl chloride resin.

FIG. 6 shows the emissivity for the atmospheric window of vinyl chloride resin (PVC) as a representative example of resin having the carbon-chlorine bond. Also, FIG. 19 shows emissivity for the atmospheric window of vinylidene chloride resin (PVDC).

Respecting the carbon-chloride bond, the absorption coefficient due to the C—Cl stretching vibration appears in a wide range having half width of 1 μm or more, around 12 μm wavelength.

Further, in the case of vinyl chloride resin, due to the influence of electron absorption by chlorine, the absorption coefficient due to the bending vibration of C—H of alkene contained in the main chain appears around 10 μm wavelength. Same is true with vinylidene chloride resin.

Due to these influences, the wavelength average of emissivity of 10 μm thickness is 45% from 8 μm to 14 μm wavelength, which is confined within the requirement of 40% or higher. As shown, with increase of the membrane thickness, the emissivity in the atmospheric window range increases.

[Ethylene Terephthalate Resin]

Figure 7:
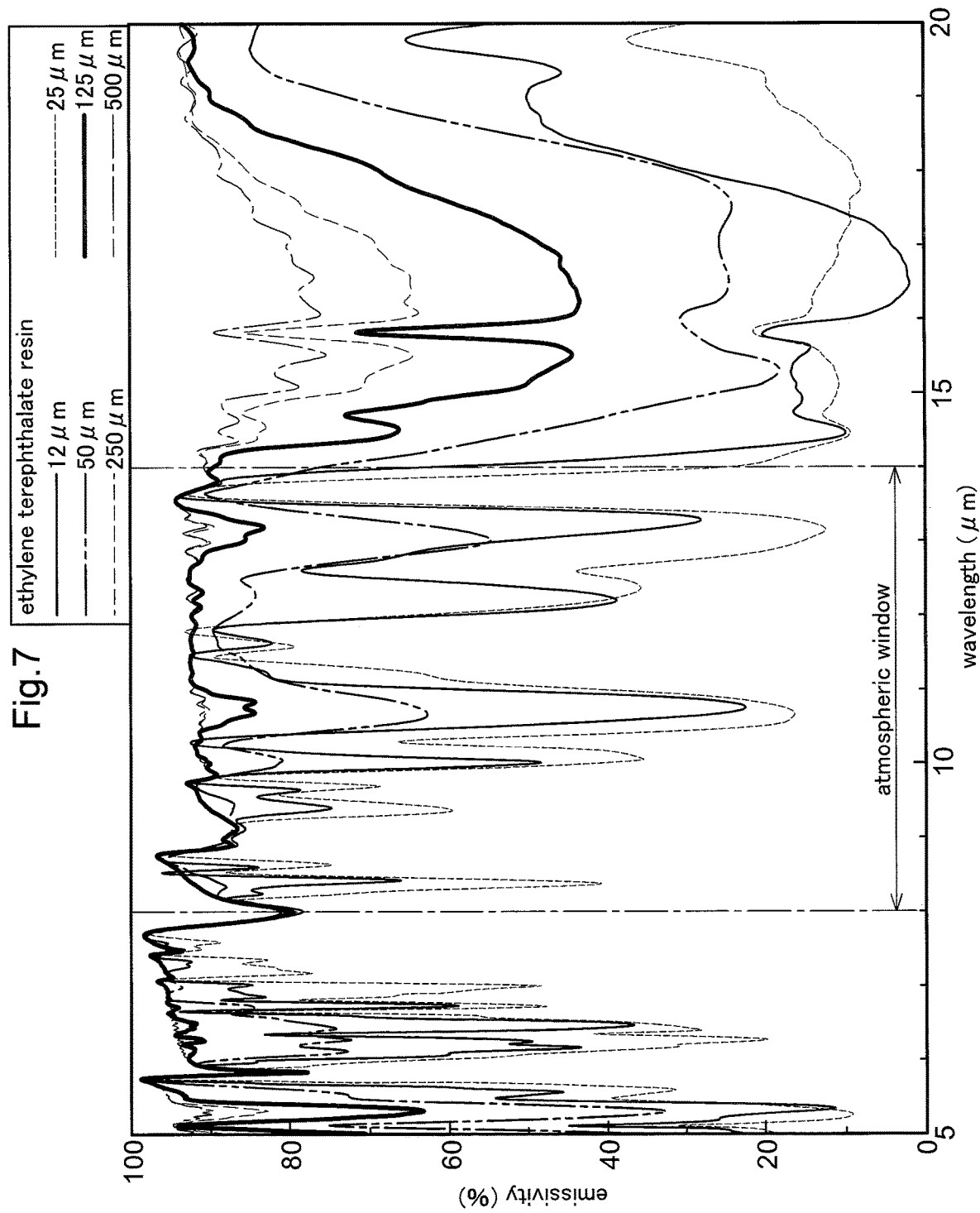
FIG. 7 is a view showing emissivity spectrum of ethylene terephthalate resin.

FIG. 7 shows emissivity for the atmospheric window of ethylene terephthalate resin, as a representative example of resins having the ester bond or the benzene ring.

Regarding the ester bond, it has absorption coefficient from 7.8 μm to 9.9 μm wavelength. Further, regarding the carbon-oxygen bond included in the ester bond, strong absorption coefficient appears from 8 μm to 10 μm wavelength. If the benzene ring is introduced in the side chain of hydrocarbon resin, due to vibration of the benzene ring per se or vibration of the surrounding elements due to the influence of the benzene ring, absorption appears broadly from 8.1 μm to 18 μm wavelength.

Due to these influences, the wavelength average of emissivity of 10 μm thickness is 71% from 8 μm to 14 μm, which is confined within the requirement of 40% or higher average wavelength. As shown, with increase of membrane thickness, the emissivity for the atmospheric window range increases.

[Emissivity of Olefin Modified Material]

Figure 8:
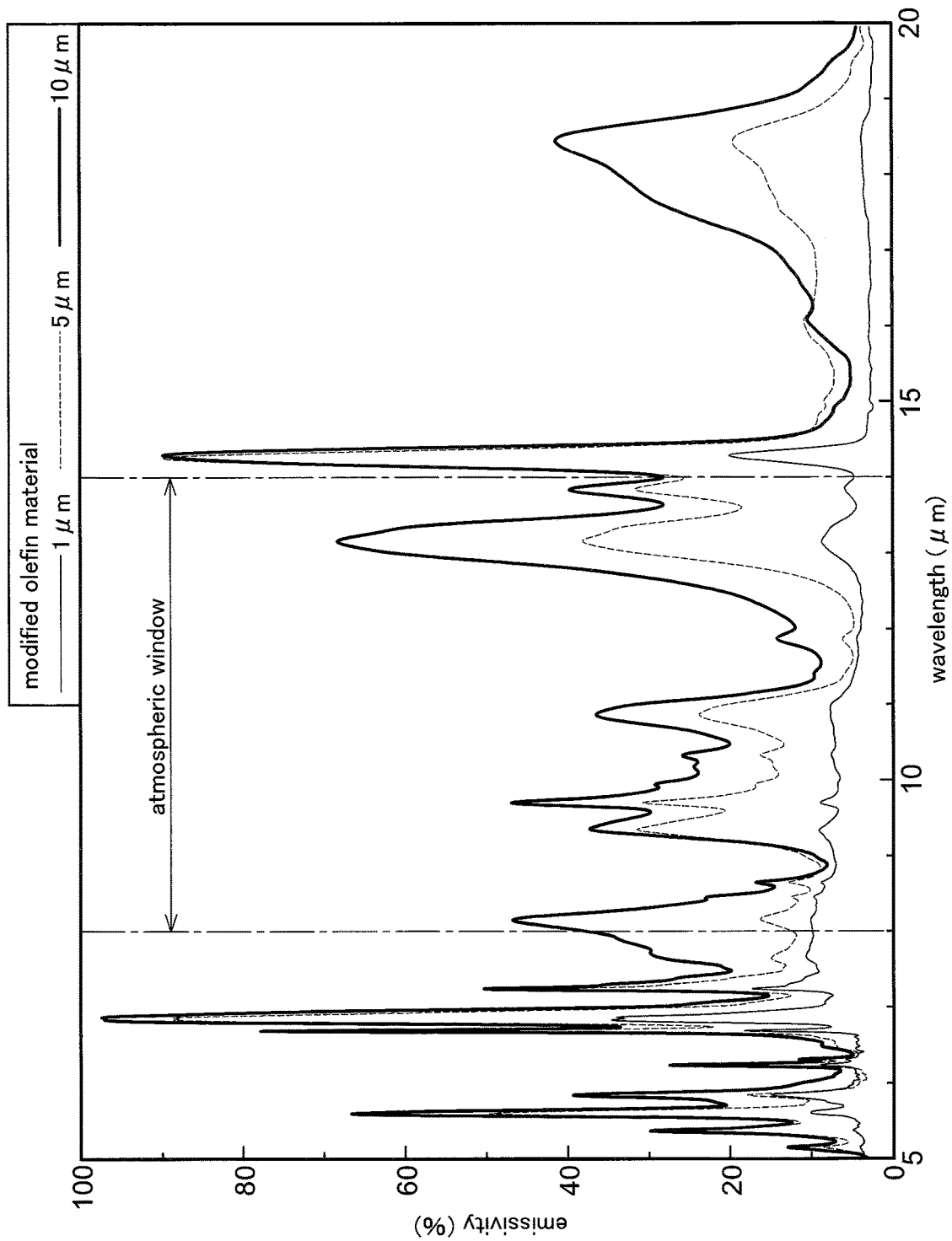
FIG. 8 is a view showing emissivity spectrum of olefin modified material.

FIG. 8 shows emissivity spectrum of olefin modified material that contains olefin as the main component thereof and that does not have any of the carbon-fluorine bond (C—F), the carbon-chlorine bond (C—Cl), the ester bond (R—COO—R), the ether bond (C—O—C) and the benzene ring. A sample was produced by applying and drying olefin resin on vapor-deposited silver by a bar coater.

As shown, the emissivity for the atmospheric window range is small. And, due to this, the wavelength average of the emissivity at 10 μm thickness is 27% from 8 μm to 14 μm wavelength which does not satisfy the requirement of wavelength average of 40% or higher.

The illustrated emissivity is of the olefin which was modified for the bar coater application. In the case of pure olefin resin, the emissivity for the atmospheric window range is even lower.

In this way, in the case of absence of the carbon-fluorine bond (C—F), the carbon-chlorine bond (C—Cl), the ester bond (R—COO—R), the ether bond (C—O—C) and the benzene ring, no radiative cooling effect can be achieved.

[Temperatures of Surfaces of Light Reflective Layer and Resin Material Layer]

Heat radiation for atmospheric window of the resin material layer J occurs near the surface of the resin material.

As shown in FIG. 4, in the case of silicone rubber, its heat radiation for the atmospheric window does not increase if its thickness is greater than 10 μm. Namely, in the case of silicone rubber, most of the heat radiation for the atmospheric window occurs at the portion within about 10 μm depth from the surface, whereas the heat radiation of the deeper portion does not appear to the outside.

As shown in FIG. 5, in the case of fluororesin, even if its thickness becomes greater than 100 μm, the heat radiation for the atmospheric window hardly increases. Namely, in the case of fluororesin, most of the heat radiation for the atmospheric window occurs at the portion within about 100 μm depth from the surface, whereas the heat radiation of the deeper portion does not appear to the outside.

As shown in FIG. 6, in the case of vinyl chlorine resin, even if its thickness becomes greater than 100 μm, the heat radiation for the atmospheric window hardly increases. Namely, in the case of vinyl chlorine resin, most of the heat radiation for the atmospheric window occurs at the portion within about 100 μm depth from the surface, whereas the heat radiation of the deeper portion does not appear to the outside.

From FIG. 19, it is understood that vinylidene chloride resin is similar to vinyl chloride resin.

As shown in FIG. 7, in the case of ethylene terephthalate resin, even when its thickness becomes greater than 125 μm, increase of emissivity for the atmospheric window range hardly occurs. Namely, in the case of ethylene terephthalate resin, the heat radiation for the atmospheric window occurs at the portion within about 100 μm depth from the surface, whereas the heat radiation of the deeper portion does not appear to the outside.

As described above, the heat radiations for the atmospheric window range occurring from the resin material surfaces occur mostly at the portions within about 100 μm depth from the surfaces and with further increase of the thickness, due to the resin materials not contributing to heat radiation, cold heat provided by the radiative cooling of the radiative cooling device is insulated.

Next, production of a light reflective layer B on a resin material layer J which does not absorb the solar light at all ideally will be considered. In this case, the solar light will be absorbed solely by the light reflective layer B of the radiative cooling device CP.

Thermal conductivities of resin materials range generally around 0.2 W/m/K approximately. When calculation is made with taking this thermal conductivity into consideration, when the thickness of the resin material layer J exceeds 20 mm, there occurs rise in the temperature of the cooling surface (the surface of the light reflective layer B on the side opposite to the presence side of the resin material layer J).

Figure 9:
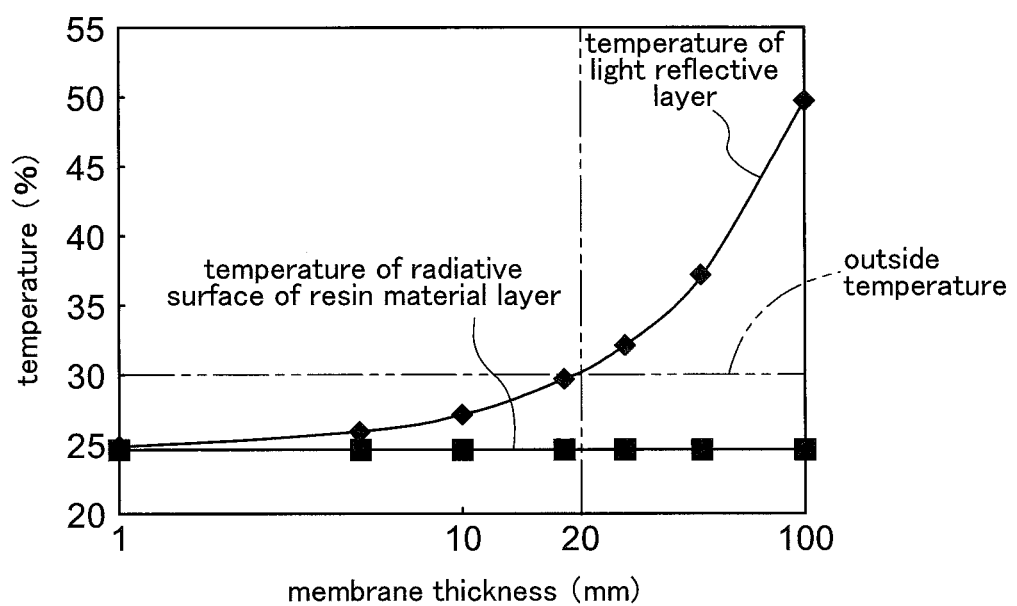
FIG. 9 is a view showing relation between temperature of radiative surface and temperature of light reflective layer.

Even if there existed such ideal resin material that does not absorb the solar light at all, since the thermal conductivity of the resin material is about 0.2 W/m/K, the light reflective layer B receiving the solar irradiation would still be heated when the thickness exceeds 20 mm as shown in FIG. 9, so that the cooling target E disposed on the side of the light reflective layer would be heated. Namely, the thickness of the resin material of the radiative cooling device CP needs to be equal to or less than 20 mm.

Incidentally, FIG. 9 shows plotting of the surface temperature of the radiative surface H and the temperature of the light reflective layer B of the radiative cooling device (radiative cooling film) which were calculated on a premise of the time of meridian passing on a fair weather day in the western part of Japan in midsummer. The solar light is assumed to be AM1.5 and the energy density is assumed to be 1000 W/m$^2$. Further, the outside temperature is 30° C. and the radiation energy, though it varies with the temperature, is 100 W at 30° C. Also, the calculation is made on the assumption of no absorption of solar light by the resin material layer. Further, a zero-wind condition is assumed and the convective heat transfer coefficient is assumed to be 5 W/m$^2$/K.

[Light Absorbance of Silicone Rubber, Etc.]

FIG. 10 shows the light absorbance for the solar light spectrum when the thickness of silicone rubber having CH$_3$ side chain has 100 μm thickness and the light absorbance spectrum for the solar light spectrum of perfluoroalkoxy fluororesin having 100 μm thickness. As described hereinbefore, both these resins have almost no light absorbance in the ultraviolet range.

Regarding silicone rubber, in the near infrared range, the light absorbance increases in the range of longer wavelength side than 2.35 μm wavelength. However, since the intensity of the solar light spectrum is weak in this wavelength range, even when the light absorbance increases in the range of longer wavelength side than 2.35 μm becomes 100%, the absorbed solar light energy is 20 W/m$^2$.

Regarding perfluoroalkoxy fluororesin, this has almost no light absorbance in the wavelength range from 0.3 μm to 2.5 μm, but has light absorbance in the wavelength range longer than 2.5 μm. However, even if the membrane thickness of this resin is increased and the light absorbance on the longer wavelength side than 2.5 μm becomes 100%, the absorbed light energy is only about 7 W.

Incidentally, when the thickness (membrane thickness) of the resin material layer J is increased, the emissivity for the atmospheric window ranges becomes substantially 1 (one). Namely, in the case of large thickness, the heat radiation for the atmospheric window range at the time of use in a lowland becomes from 160 W/m$^2$ to 125 W/m$^2$ at 30□. The light absorption by the light reflective layer B is about 50 W/m$^2$ as defined by the above-described requirement. Thus, even when the light absorbance of the light reflective layer B is added with the solar light absorbance of silicone rubber or perfluoroalkoxy fluororesin which is formed as a thick membrane, the sum will still be smaller than the heat radiation to be radiated into the outer space.

For the reasons above, the maximum membrane thickness of silicone rubber and perfluoroalkoxy fluororesin is 20 mm from the viewpoint of heat conductivity.

[Light Absorption of Hydrocarbon Resin]

In case the resin material forming the resin material layer J is a resin having as the main chain thereof a hydrocarbon having one or more of the carbon-chlorine bond, the carbon-oxygen bond, the ester bond, the ether bond and the benzene ring, or in case the resin material is a silicone resin whose carbon number of the hydrocarbon of its side chain is two or more, absorption due to vibrations such as bending or stretching of the bond is observed in the near infrared range, in addition to the ultraviolet ray absorption by the covalently bonded electrons described above.

Specifically, absorptions due to the reference tones of transitions to the first excited states of CH$_3$, CH$_2$, CH appear in the wavelengths from 1.6 μm to 1.7 μm, the wavelength from 1.65 μm to 1.75 μm, and at the wavelength of 1.7 μm respectively. Further, absorption of the combination (resultant) tone of CH$_3$, CH$_2$, CH by the reference tone of appear in the wavelength of 1.35 μm, the wavelength of 1.38 μm, and the wavelength of 1.43 μm, respectively. Further, the harmonics of transitions of CH$_2$ and CH to the second excited state appear around the wavelength of 1.24 μm, respectively. The reference tones of bending and stretching of the C—H bond are distributed in the wide range from 2 μm to 2.5 μm wavelength.

Further, in case of having the ester bond (R—COO—R), the ether bond (C—O—C), large light absorption is present around 1.9 μm wavelength.

The light absorbances due to these will become less conspicuous when the membrane thickness of the resin material is small, but will increase when the membrane thickness is large, as shown by the light absorbance relational expression described above.

Figure 11:
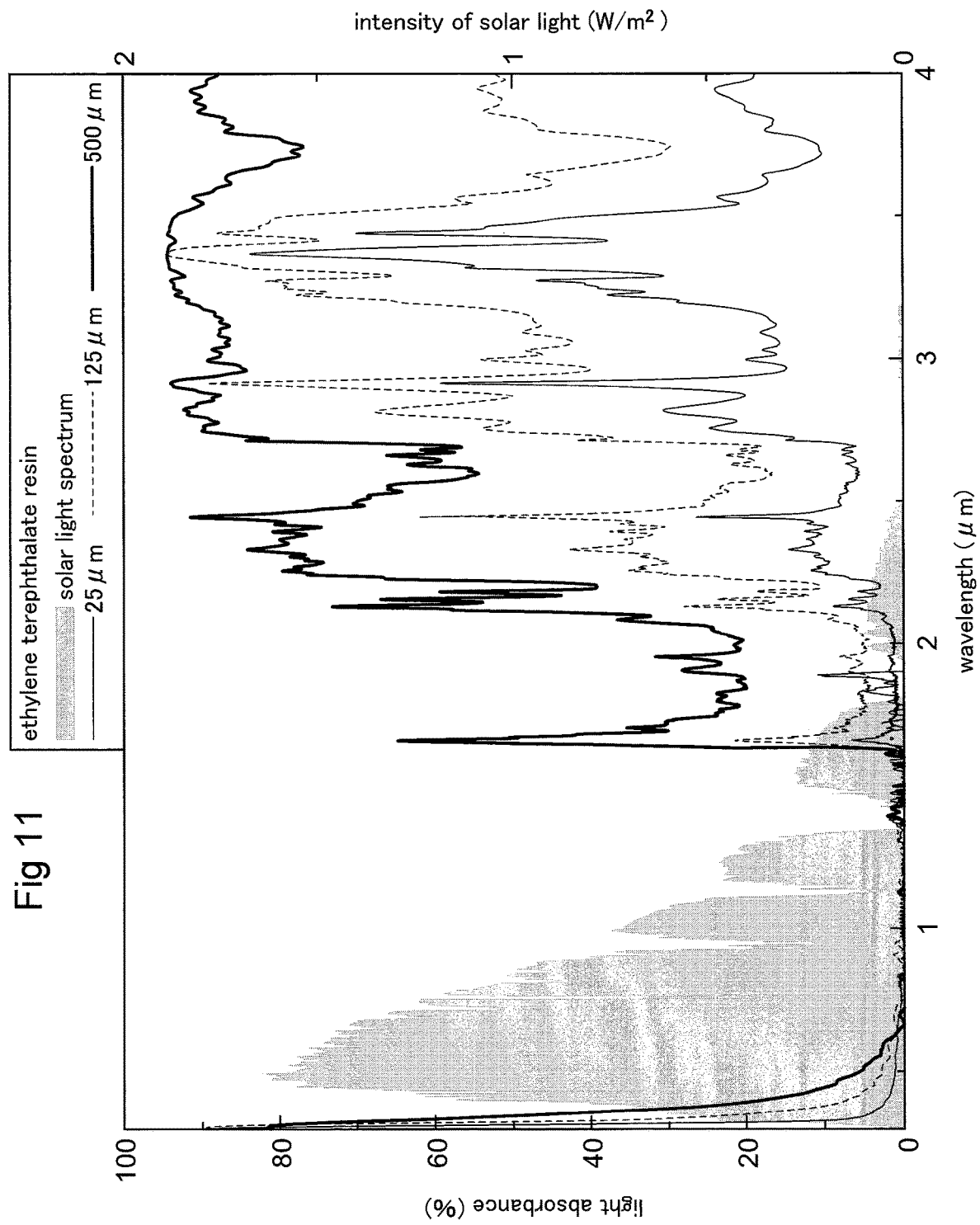
FIG. 11 is a view showing light absorption spectrum of ethylene terephthalate resin.

FIG. 11 shows relation between the light absorbance and the solar light spectrum in case the membrane thickness of ethylene terephthalate resin having the ester bond and the benzene ring is varied.

As shown, when the membrane thickness increases from 25 μm, 125 μm and 500 μm, the light absorption of the longer wavelength range than 1.5 μm due to the respective vibration increases.

Further, in addition to the long wavelength range, the light absorption increases also from the ultraviolet range to the visible light range. This is attributable to the broadening of the light absorption end due to the chemical bond.

When the membrane thickness is small, the light absorbance is large in the wavelength having the largest absorbance coefficient. With increase of the membrane thickness, from the above-described light absorbance relational expression, weak absorption coefficient at a broad absorption end will become and appear as the absorbance. For this reason, with increase of the membrane thickness, the light absorption from the ultraviolet range to the visible light range increases.

The absorbance of the solar light spectrum is 15 W/m$^2$ when the thickness is 25 μm. The absorbance of the solar light spectrum is 41 W/m$^2$ when the thickness is 125 μm. The absorbance of the solar light spectrum is 88 W/m$^2$ when the thickness is 500 μm.

Since the light absorption of the light reflective layer B is 50 W/m$^2$ according to the above requirement, in the case of 500 μm membrane thickness, the sum of the solar light absorption by the ethylene terephthalate resin and the solar light absorption by the light reflective layer B becomes 138 W/m$^2$. In a lowland in Japan in summer time, the maximum value of infrared radiation in the wavelength range of the atmospheric range is about 160 W when the condition of the atmosphere is good, or normally about 125 W at 30° C.

For the reasons above, if the membrane thickness of ethylene terephthalate resin exceeds 500 μm, no radiative cooling effect can be achieved.

The origin of the absorption spectrum of the wavelength range from 1.5 μm to 4 μm is not the functional group, but vibration of hydrocarbon of the main chain. Any hydrocarbon resin exhibits similar behavior to ethylene terephthalate resin. Further, hydrocarbon resin has light absorption due to the chemical bond in the ultraviolet range and exhibits similar behavior to ethylene terephthalate from the ultraviolet to visible light range also.

Namely, any hydrocarbon resin exhibits similar behaviors to ethylene terephthalate resin from 0.3 μm to 4 μm wavelength range. For the reasons above, the membrane thickness of hydrocarbon resin needs to be less than 500 μm.

[Light Absorption of Blend Resin]

In case the resin material is a blended resin material obtained by blending a resin having the carbon-fluorine bond or the siloxane bond as the main chain and a resin having hydrocarbon as the main chain, in accordance with the ratio of the blended resin having hydrocarbon as the main chain, light absorptions in the near infrared range due to CH, CH$_2$, CH$_3$, etc. will appear.

In the case of the carbon-fluorine bond or the siloxane bond being the main component, the light absorption in the near infrared range due to hydrocarbon is smaller, so that the thickness can be increased to the upper limit of 20 mm defined from the viewpoint of thermal conductivity. However, in the case of blended hydrocarbon resin being the main component, the thickness needs to be equal to or less than 500 μm.

The blend of fluororesin or silicone rubber with hydrocarbon includes one in which the side chain of fluororesin or silicone rubber is substituted with hydrocarbon, alternate copolymer, random copolymer, random copolymers, block copolymers and graft copolymers of fluorine monomer and silicone monomer and hydrocarbon monomer. Incidentally, as examples of alternate copolymer of fluorine monomer and hydrocarbon monomer, fluoroethylene vinyl ester (FEVE), fluoroolefin-acrylic acid ester copolymer, ethylene/tetrafluoroethylene copolymer (ETFE), ethylene/chlorotrifluoroethylene copolymer (ECTFE) can be cited.

In accordance with the molecular weight and the ratio of the hydrocarbon side chain to be substituted, the light absorption of the near infrared range due to CH, CH$_2$, CH$_3$ appears. In case the monomer to be introduced as a side chain or copolymer has a low molecular weight or the introduced monomer has low density, the light absorption of the near infrared range due to hydrocarbon becomes smaller, so that the thickness can be increased to 20 mm which is the limit defined from the viewpoint of thermal conductivity.

In case a hydrocarbon having a high molecular weight is to be introduced as a side chain of fluororesin or silicone rubber or as a monomer to be copolymerized, it is necessary to set the thickness of the resin to equal to or less than 500 μm.

[Thickness of Resin Material Layer]

From the viewpoint of utility of the radiative cooling device CP, the smaller the thickness of the resin material layer J, the better. The thermal conductivity of resin material is generally lower than those of metals or glass. Thus, in order to cool a cooling target E effectively, the membrane thickness of the resin material layer J should be set to the necessary minimal. With increase of the membrane thickness of the resin material layer J, heat radiation of the atmospheric window increases. And, when it exceeds a certain membrane thickness, the thermal radiation energy of the atmospheric window become satiated.

Respecting the membrane thickness which results in saturation, the saturation will occur with sufficiently high likelihood when it is not more than 300 μm approximately in the case of fluororesin. Therefore, it is desirable to limit the membrane thickness of the resin material layer to equal to or less than 300 μm, rather than 500 μm, from the viewpoint of thermal conductivity. Further, although the saturation of heat radiation has not occurred yet, even if the thickness is only about 100 μm, sufficient heat radiation for the atmospheric window range can be obtained. When the thickness is smaller, the heat transmission coefficient becomes greater, so that the temperature of the cooling target can be reduced more effectively. Thus, in the case of fluororesin for instance, the thickness may be set to equal to or less than 100 μm approximately.

The absorption coefficients due to the carbon-silicon bond, the carbon-chlorine bond, the carbon-oxygen bond, the ester bond and the ether bond are greater than the absorption coefficient due to the C—F bond. Needless to say, from the viewpoint of thermal conductivity, desirably, the thickness should be set to equal to or less than 300 μm, rather than 500 μm. However, even more radiant cooling effect can be expected with increase of the thermal conductivity through further reduction in the membrane thickness.

In the case of a resin material having the carbon-chlorine, the carbon-oxygen bond, the ester bond, the ether bond and a benzene ring, even when its thickness is 100 μm, the thermal radiation energy for the atmospheric window is saturated, so sufficient radiative cooling effect for the atmospheric window can be obtained even with thickness of 50 μm.

When the thickness of the resin material is smaller, the heat transmission coefficient becomes greater, so that the temperature of the cooling target can be reduced more effectively. Therefore, in the case of a resin material having the carbon-chlorine, the carbon-oxygen bond, the ester bond, the ether bond and the benzene ring, with thickness equal to or less than 50 μm, the heat insulation becomes smaller, and the cooling target E can be cooled effectively.

In the case of the carbon-chlorine bond, the cooling target can be cooled effectively if the thickness is equal to or less than 100 µm.

The advantages of thickness reduction are not limited to the possibility of heat insulation for facilitating conduction of cold heat. Another advantage is suppression of light absorption in the near infrared range due to CH, $CH_2$, $CH_3$ in the near infrared range exhibited by such resin having the carbon-chlorine, the carbon-oxygen bond, the ester bond, the ether bond. With thickness reduction, the solar light absorption by these can be reduced, so that the cooling capacity of the radiative cooling device CP is enhanced.

For the above-described viewpoints, in the case of a resin material having the carbon-chlorine, the carbon-oxygen bond, the ester bond, the ether bond and the benzene ring, with thickness equal to or less than 50 µm, the radiant cooling effect can be achieved more effectively under solar irradiation.

In the case of the carbon-silicon bond, even when its thickness is 50 µm, the thermal radiation energy for the atmospheric window is saturated already, so sufficient radiative cooling effect for the atmospheric window can be obtained even with thickness of 10 µm. When the thickness of the resin material is smaller, the heat transmission coefficient becomes greater, so that the temperature of the cooling target E can be reduced more effectively. Therefore, in the case of a resin material having the carbon-silicon bond, with thickness equal to or less than 10 µm, the heat insulation becomes smaller, and the cooling target E can be cooled effectively. With thickness reduction, the solar light absorption can be reduced, so that the cooling capacity of the radiative cooling device CP is enhanced.

From the above-described viewpoints, in the case of a resin material having the carbon-silicon bond, with thickness equal to or less than 10 µm, the radiant cooling effect can be achieved more effectively under solar irradiation.

[Details of Light Reflective Layer]

In order to provide the light reflective layer B with the above-described reflectance characteristics, the reflective material on the presence side of the radiative surface H (the presence side of the resin material layer J) needs to be silver or silver alloy.

Figure 12:
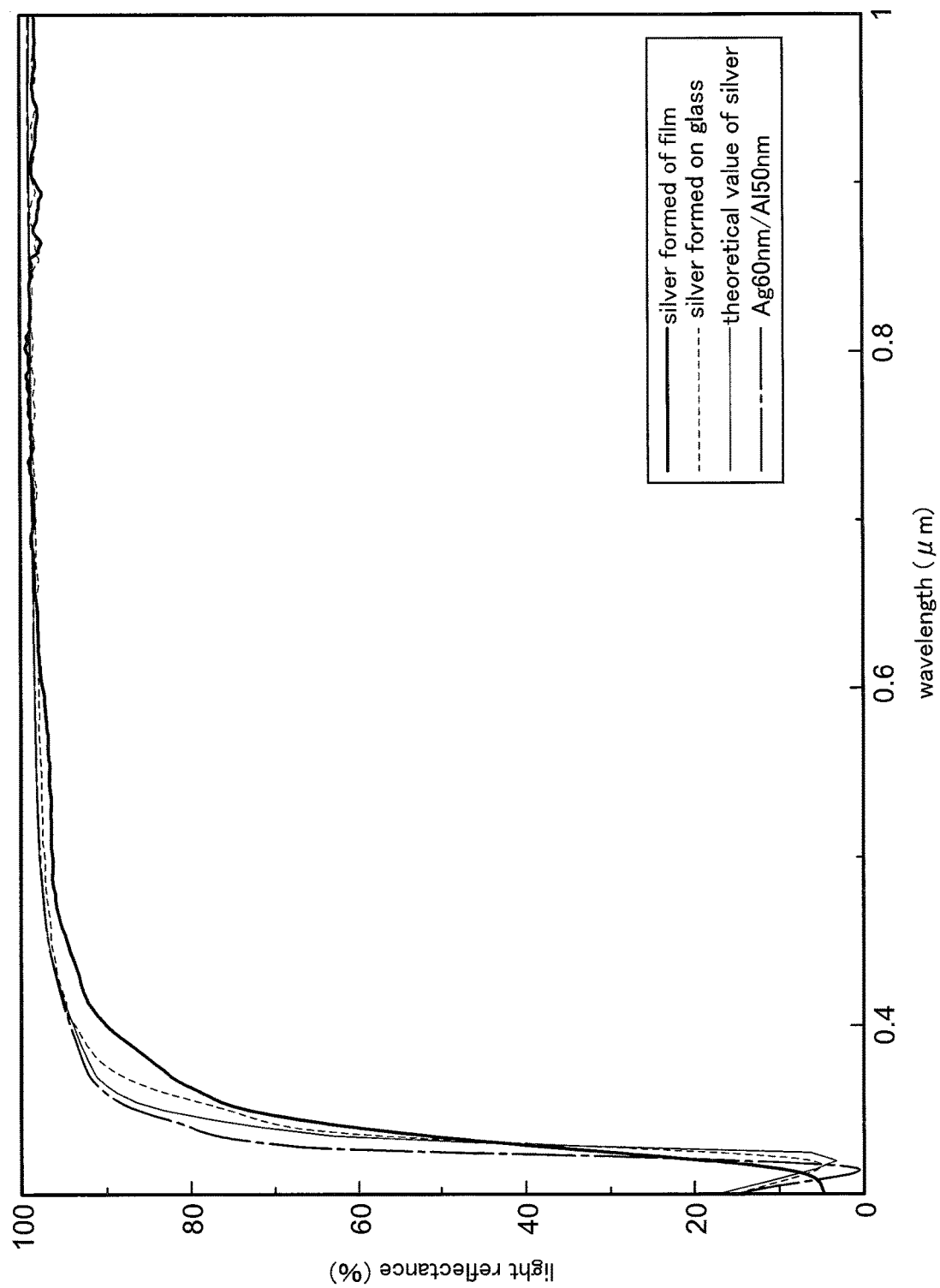
FIG. 12 is a view showing light reflectance spectrum of light reflective layer based on silver.

As shown in FIG. 12, if the light reflective layer B is constituted of silver as its base, the reflectance required of the light reflective layer B can be obtained.

In case the solar light is reflected by silver or silver alloy alone which is provided with the above-described reflectance characteristics, the thickness equal to or greater than 50 nm is needed.

However, in order to provide the light reflective layer B with flexibility, the thickness needs to be equal or less than 100 µm. If the thickness is greater than this, the flexibility decreases.

By the way, as the "silver alloy", it is possible to employ an alloy made of silver added with any one or more of copper, palladium, gold, zinc, tin, magnesium, nickel, titanium by a ratio from 0.4 to 4.5 mass % approximately. As a specific example, it is possible to employ "APC-TR" (manufactured by Furuya Metal Co., Ltd.), which is a silver alloy prepared by adding copper and palladium to silver.

In order to provide the light reflective layer B with the above-described reflectance characteristics, this may be configured as a stacked structure of silver or silver alloy and aluminum or aluminum alloy. Incidentally, in this case too, the reflective material on the presence side of the radiative surface H (the presence side of the resin material layer J) needs to be silver or silver alloy.

In the case of configuring it as two layers of silver (silver alloy) and aluminum (aluminum alloy), the thickness of silver needs to be equal to or greater than 10 nm, and the thickness of aluminum needs to be equal to or greater than 30 nm.

However, in order to provide the light reflective layer B with flexibility, the total thickness of silver and aluminum needs to be equal to or less than 100 µm. If the thickness is greater than this, the flexibility decreases.

Incidentally, as the "aluminum alloy", it is possible to employ an alloy made of aluminum added with any one or more of copper, manganese, silicon, magnesium, zinc, carbon steel for machine structure, yttrium, lanthanum, gadolinium, terbium.

Silver and silver alloy are vulnerable to exposure to wind, rain and humidity, thus needing to be protected from these. To this end, as shown in FIGS. 15 through 18, adjacent to silver or silver alloy, a protective layer D for silver ("silver protective layer") is needed.

As this silver protective layer D, it is possible to employ, acrylic resin, silicone resin, fluororesin, oxide membrane ($SiO_2$, $Al_2O_3$), etc. Regarding its thickness, desirably, it should be equal to or more than 0.02 µm in the case of an inorganic material. It should be equal to or greater than 0.5 µm in the case of an organic material. An inorganic material, due to its lower oxygen transmittance, can effectively act as silver protection even in a small thickness.

[Experiment Results]

Silver was formed in 300 nm thickness on a glass substrate, on which silicone rubber having the siloxane bond, fluoroethylene vinyl ether having the carbon-fluorine bond and modified olefin (modified olefin material) were applied by a bar coater with implementing membrane thickness control simultaneously. Then, the radiative cooling performance was determined. Vinyl chloride resin was affixed onto silver and the radiative cooling performance was determined.

Evaluations of the radiative cooling performances were made 3 hours after the meridian crossing outdoors in late June at the outside temperature of 350. While the substrate was kept under high heat insulation, the temperature (Q) of the back face of the substrate was determined. Respecting the vinyl chloride resin, the evaluation was made when the outside temperature was 290. The evaluation was made to find whether the temperature 5 minutes after the installation of the tool was lower than the outside temperature or not or the radiative cooling effect was present or not.

The results of the radiative cooling test are shown in Table 1 in FIG. 14.

Figure 13:
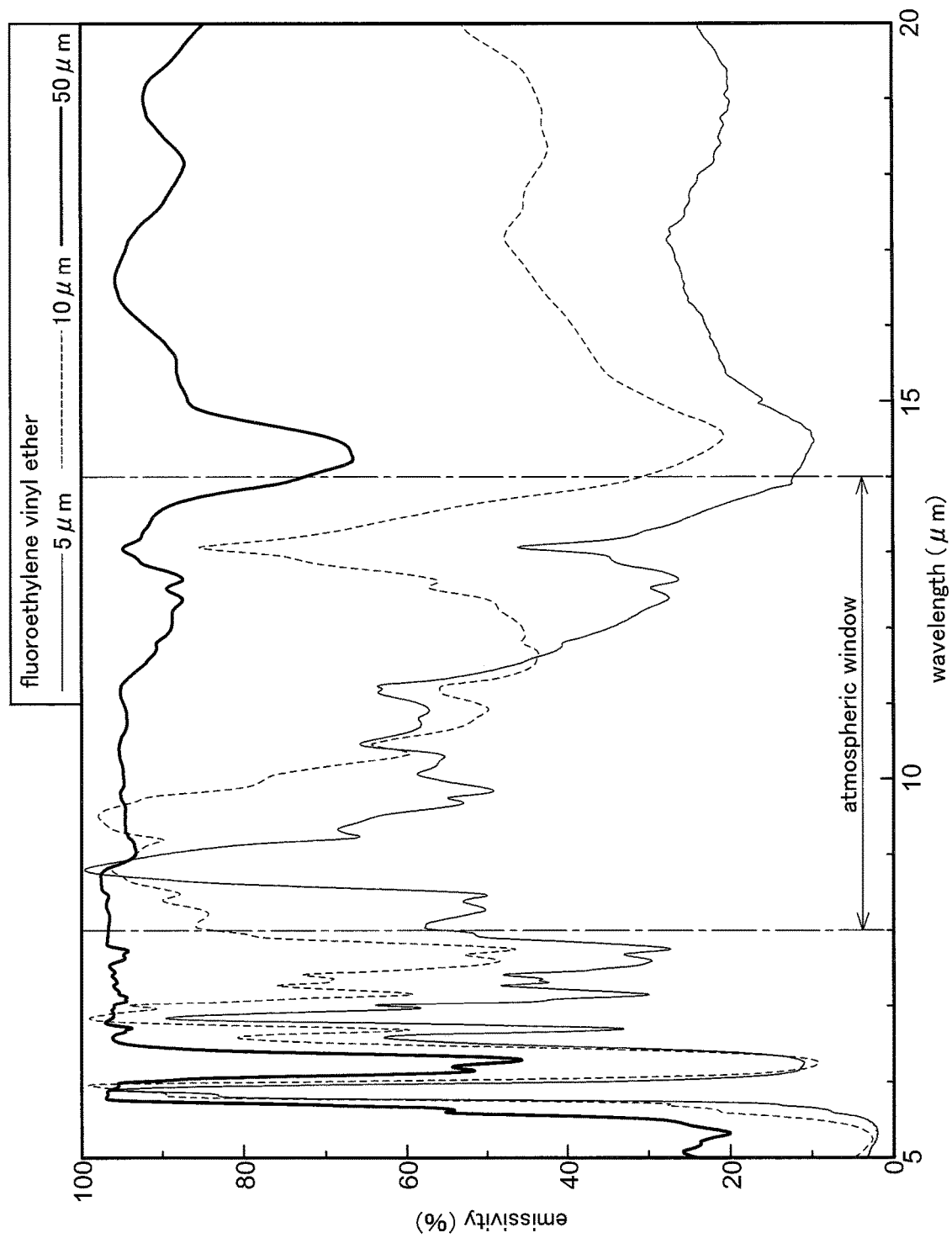
FIG. 13 is a view showing emissivity spectrum of fluoroethylene vinyl ether.

By the way, the emissivity for the atmospheric window of fluoroethylene vinyl ether is as shown in FIG. 13. Incidentally, the emissivity of silicone rubber is as shown in FIG. 4 and the emissivity of modified olefin (modified olefin material) is as shown in FIG. 8 and the emissivity of vinyl chloride resin is as shown in FIG. 6.

In the case of the silicone rubber having the siloxane bond, it was found that it provides radiative cooling capacity when its thickness is equal to or greater than 1 µm, as theoretically expected.

In the case of fluoroethylene vinyl ether having the carbon-fluorine bond, it was found that it provides the radiative cooling capacity when the membrane thickness is 5 µm which is smaller than the value of 10 µm which was theoretically anticipated. This is attributable not only to the light absorption of atmospheric window by the carbon-fluorine bond, but also light absorption due to the ether bond of vinyl ether, thus resulting in greater light absorbance for the atmospheric window range as a whole than individually respectively.

The modified olefin (modified olefin material) does not have any radiative cooling capacity because it has almost no heat radiation for the atmospheric window range.

(Specific Arrangement of Radiative Cooling Device)

The radiative cooling device CP of the present invention, as shown in FIGS. 15-18, can be configured as a film structure. The resin material forming the resin material layer J is flexible originally. Thus, when the light reflective layer B is formed as a thin membrane, this light reflective layer B too can be provided with flexibility. As a result, the radiative cooling device CP can be provided as a film having flexibility (radiative cooling film).

The film-like radiative cooling device CP (radiative cooling film) can be applied with bonding agent and wrapped around an outer circumference of a vehicle, an exterior wall of a warehouse or a building or an outer circumference of a helmet, to provide its radiative cooling effect. In this way, by being retrofitted to a pre-installed or existing object, the radiative cooling capacity thereof can be readily provided to the object.

In order to produce the radiative cooling device CP in the form of a film, various modes are conceivable. For instance, it may be produced by applying the resin material layer J to the light reflective layer B which was produced in the form of a film. Alternatively, the resin material layer J may be affixed or bonded to the light reflective layer B which was produced in the form of a film. Further alternatively, on the resin material layer J which was produced in the form of a film, the light reflective layer B may be produced by such technique as vapor deposition, sputtering, ion plating, mirror reaction, etc.

Referring more specifically, for producing the radiative cooling device CP (radiative cooling film) shown in FIG. 15, the light reflective layer B may be formed as one layer of silver or silver alloy or is produced as two layers of silver (silver alloy) and aluminum (aluminum alloy), on the opposed sides of this light reflective layer B, protective layers D are formed and on the top of the upper side protective layer D, the resin material layer J is formed.

As a method of producing the radiative cooling device CP (radiative cooling film) shown in FIG. 15, it is also possible to employ a method of applying the silver projective layer D, the light reflective layer B and the silver protective layer D one after another on the resin material layer J in the form of a film, thus being formed integrally.

For producing the radiative cooling device CP (radiative cooling film) shown in FIG. 16, the light reflective layer B is formed of an aluminum layer B1 formed as an aluminum foil acting as aluminum (aluminum alloy), a silver layer B2 formed of silver or silver alloy, and on the upper side of this light reflective layer B, a protective layer D is formed and on top of this protective layer D, the resin material layer J is formed.

As another method of producing the radiative cooling device CP (radiative cooling film) shown in FIG. 16, on top of an aluminum layer B1 formed as an aluminum foil, a silver layer B2, a protective layer D and a resin material layer J are applied one after another to be formed integrally.

As still another producing method, it is possible to employ a method in which the resin material layer J is formed as a film and on top of this film-like resin material layer J, the protective layer D and the silver layer B2 are applied one after another and then an aluminum layer B1 is bonded to the silver layer B2.

Figure 17:
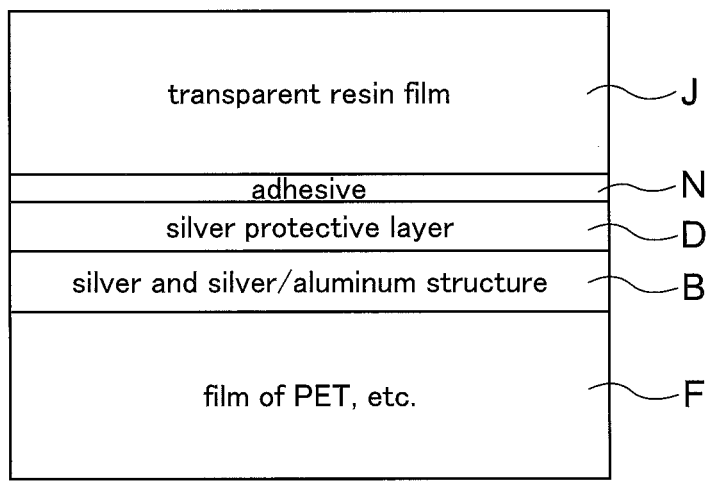
FIG. 17 is a view showing a specific arrangement of a radiative cooling device.

Regarding the radiative cooling device CP (radiative cooling film) shown in FIG. 17, in case the light reflective layer B is formed as one layer of silver or silver alloy or as two layers of silver (silver alloy) and aluminum (aluminum alloy), on top of this light reflective layer B, the protective layer D is formed and on top of this protective layer D, the resin material layer J is formed. And, under the light reflective layer B, a film layer F of PET, etc. is formed.

As a producing method of the radiative cooling device CP (radiative cooling film) shown in FIG. 17, it is possible to employ a method in which on top of a film layer F formed like a film of PET (polyethylene terephthalate) etc., the light reflective layer B and the protective layer D are applied one after another to be formed integrally. Then, to the protective layer D, the resin material layer J separately formed like a film is bonded via an adhesive layer N.

As a bonding agent for use in the adhesive layer N, there are e.g. acryl-based adhesive, fluorine-based adhesive, and silicone-based adhesive. Such bonding agent should desirably have high transparency for the solar light. Incidentally, urethane-based bonding agent often used as a bonding agent is not suitable as it can easily deteriorate when exposed to the ultraviolet rays.

Figure 18:
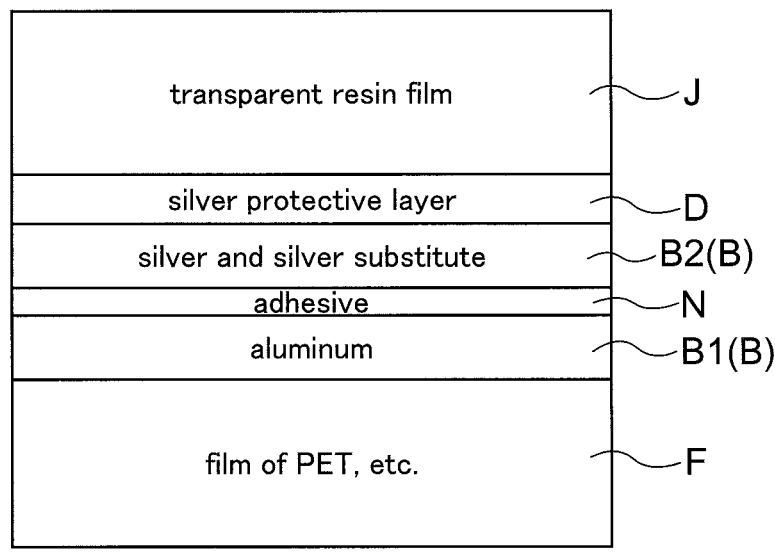
FIG. 18 is a view showing a specific arrangement of a radiative cooling device.

Regarding the radiative cooling device CP (radiative cooling film) shown in FIG. 18, the light reflective layer B is formed of an aluminum layer B1 formed as an aluminum foil acting as aluminum (aluminum alloy) and a silver layer B2 formed of silver or silver alloy (silver substitute). The aluminum layer B1 is formed on top of the film layer F formed like a film of PET (polyethylene terephthalate) etc. On top of the silver layer B2, the protective layer D is formed. And, on top of this protective layer D, the resin material layer J is formed.

As a producing method of the radiative cooling device CP (radiative cooling film) shown in FIG. 18, it is possible to employ a method as follows. Namely, on top of the film layer F, the aluminum layer B1 is applied to form the film layer F and the aluminum layer B1 integrally. Separately, on top of the film-like resin material layer J, the protective layer D and the silver layer B are applied to form the resin material layer J, the protective layer D and the silver layer B2 integrally. Then, the aluminum layer B1 and the silver layer B2 are bonded to each other via the adhesive layer N.

As a bonding agent for use in the adhesive layer N, there are e.g. acryl-based adhesive, fluorine-based adhesive, and silicone-based adhesive. Such bonding agent should desirably have high transparency for the solar light. Incidentally, urethane-based bonding agent often used as a bonding agent is not suitable as it can easily deteriorate when exposed to the ultraviolet rays.

OTHER EMBODIMENTS (1) In the foregoing embodiment, there was disclosed an exemplary case in which the resin material layer J and the light reflective layer B are placed in gapless contact with each other entirely. Instead, by joining the resin material layer J and the light reflective layer B partially, a gap capable of heat transfer may be partially present between the resin material layer J and the light reflective layer B.

(2) In the foregoing embodiment, as an example of the cooling target E, there was disclosed an object which is placed in gapless contact with the back face of the radiative cooling device CP (radiative cooling film). However, as the cooling target E, various kinds of cooling targets can be employed such as a cooling target space, etc.

Incidentally, the arrangements disclosed in the foregoing embodiment (including the other embodiments, same hereinafter) may be used in any combination with the arrangement(s) disclosed in the other embodiments as long as no contradiction results from such combination. Further, the embodiments disclosed in this detailed disclosure are only exemplary, and embodiments of the present invention are not limited thereto, but various changes and modifications will be possible in a range not deviating from the object of the present invention.

DESCRIPTION OF SIGNS

A: infrared radiative layer
B: light reflective layer
D: protective layer
H: radiative surface
J: resin material layer

The invention claimed is:

1. A radiative cooling device comprising an infrared radiative layer for radiating infrared light from a radiative surface and a light reflective layer disposed on the side opposite to the presence side of the radiative surface of the infrared radiative layer,
   wherein the infrared radiative layer comprises a resin material layer having a thickness adjusted to discharge a greater thermal radiation energy than absorbed solar light energy in a wavelength band ranging from 8 μm to 14 μm, and
   wherein the thickness of the resin material layer is adjusted to obtain:
      light absorption characteristics that provide light absorbance equal to or less than 13% for a wavelength average from 0.4 μm to 0.5 μm, light absorbance equal to or less than 4% for a wavelength average from 0.5 μm to 0.8 μm, light absorbance equal to or less than 1% for a wavelength average from 0.8 μm to 1.5 μm, and light absorbance equal to or less than 40% for a wavelength average from 1.5 μm to 2.5 μm; and
      heat emissivity characteristics of equal to or greater than 40% for wavelength average of the emissivity from 8 μm to 14 μm.

2. The radiative cooling device of claim 1, wherein the light reflective layer has reflectance equal to or greater than 90% for wavelengths from 0.4 μm to 0.5 μm and reflectance equal to or greater than 96% for wavelengths longer than 500 nm.

3. The radiative cooling device of claim 1, wherein a resin material forming the resin material layer is selected from the group consisting of resins containing one or more of carbon-fluorine bond, siloxane bond, carbon-chlorine bond, carbon-oxygen bond, ethel bond, ester bond and benzene ring.

4. The radiative cooling device of claim 1, wherein:
   the main component of a resin material forming the resin material layer is siloxane; and
   the thickness of the resin material layer is equal to or greater than 1 μm.

5. The radiative cooling device of claim 3, wherein the thickness of the resin material layer is equal to or greater than 10 μm.

6. The radiative cooling device claim 1, wherein the thickness of the resin material layer is equal to or less than 20 mm.

7. The radiative cooling device of claim 6, wherein a resin material forming the resin material layer comprises a fluororesin or silicone rubber.

8. The radiative cooling device of claim 1, wherein:
   a resin material forming the resin material layer comprises a resin having, as the main chain thereof, a hydrocarbon having one or more of a carbon-chlorine bond, a carbon-oxygen bond, an ester bond, an ether bond and a benzene ring, or a silicone resin in which a hydrocarbon as a side chain thereof has a carbon number equal to or greater than 2; and
   the thickness of the resin material layer has is equal to or less than 500 μm.

9. The radiative cooling device of claim 1, wherein:
   a resin material forming the resin material layer comprises a blend of a resin having a carbon-chlorine bond or a siloxane bond and a resin having a hydrocarbon as a main chain thereof; and
   the thickness of the resin material layer is equal to or less than 500 μm.

10. The radiative cooling device of claim 1, wherein:
    a resin material forming the resin material layer comprises fluororesin; and
    the thickness of the resin material layer is equal to or less than 300 μm.

11. The radiative cooling device of claim 1, wherein:
    a resin material forming the resin material layer comprises a resin material having one or more of a carbon-chlorine bond, a carbon-oxygen bond, an ester bond, an ether bond and a benzene ring; and
    the thickness of the resin material layer is equal to or less than 50 μm.

12. The radiative cooling device of claim 1, wherein:
    a resin material forming the resin material layer comprises a resin material having a carbon-silicon bond; and
    the thickness of the resin material layer is equal to or less than 10 μm.

13. The radiative cooling device of claim 1, wherein:
    a resin material forming the resin material layer comprises vinyl chloride resin or vinylidene chloride resin; and
    the thickness of the resin material layer is equal to or less than 100 μm and equal to or greater than 10 μm.

14. The radiative cooling device of claim 1, wherein the light reflective layer is formed of silver or silver alloy and has a thickness equal to or greater than 50 nm.

15. The radiative cooling device of claim 1, wherein the light reflective layer comprises a stacked structure of silver or silver alloy and aluminum or aluminum alloy.

16. The radiative cooling device of claim 1, wherein the resin material layer and the light reflective layer are each formed as a film.

17. A radiative cooling method comprising:
    providing a radiative cooling device according to claim 1; and
    radiating infrared light from the radiative surface of the resin material layer on the side opposite to the side contacting the light reflective layer,
    wherein the radiative surface is oriented toward the sky for radiating the infrared light from the radiative surface.

18. A radiative cooling device comprising an infrared radiative layer for radiating infrared light from a radiative surface and a light reflective layer disposed on the side opposite to the presence side of the radiative surface of the infrared radiative layer,
    wherein the infrared radiative layer comprises a resin material layer having a thickness adjusted to discharge a greater thermal radiation energy than absorbed solar light energy in a wavelength band ranging from 8 μm to 14 μm, a resin material forming the resin material layer comprises a resin having, as the main chain thereof, a hydrocarbon having one or more of a carbon-chlorine bond, a carbon-oxygen bond, an ester bond, an ether bond and a benzene ring, or a silicone resin in which a hydrocarbon as a side chain thereof has a carbon number equal to or greater than 2, and the thickness of the resin material layer has is equal to or less than 500 µm.

19. A radiative cooling device comprising an infrared radiative layer for radiating infrared light from a radiative surface and a light reflective layer disposed on the side opposite to the presence side of the radiative surface of the infrared radiative layer, wherein the infrared radiative layer comprises a resin material layer having a thickness adjusted to discharge a greater thermal radiation energy than absorbed solar light energy in a wavelength band ranging from 8 µm to 14 µm, a resin material forming the resin material layer comprises a blend of a resin having a carbon-chlorine bond or a siloxane bond and a resin having a hydrocarbon as a main chain thereof, and the thickness of the resin material layer is equal to or less than 500 µm.

20. A radiative cooling device comprising an infrared radiative layer for radiating infrared light from a radiative surface and a light reflective layer disposed on the side opposite to the presence side of the radiative surface of the infrared radiative layer, wherein the infrared radiative layer comprises a resin material layer having a thickness adjusted to discharge a greater thermal radiation energy than absorbed solar light energy in a wavelength band ranging from 8 µm to 14 µm, a resin material forming the resin material layer comprises fluororesin, and the thickness of the resin material layer is equal to or less than 300 µm.

21. A radiative cooling device comprising an infrared radiative layer for radiating infrared light from a radiative surface and a light reflective layer disposed on the side opposite to the presence side of the radiative surface of the infrared radiative layer, wherein the infrared radiative layer comprises a resin material layer having a thickness adjusted to discharge a greater thermal radiation energy than absorbed solar light energy in a wavelength band ranging from 8 µm to 14 µm, a resin material forming the resin material layer comprises a resin material having one or more of a carbon-chlorine bond, a carbon-oxygen bond, an ester bond, an ether bond and a benzene ring, and the thickness of the resin material layer is equal to or less than 50 µm.

22. A radiative cooling device comprising an infrared radiative layer for radiating infrared light from a radiative surface and a light reflective layer disposed on the side opposite to the presence side of the radiative surface of the infrared radiative layer, wherein the infrared radiative layer comprises a resin material layer having a thickness adjusted to discharge a greater thermal radiation energy than absorbed solar light energy in a wavelength band ranging from 8 µm to 14 µm, a resin material forming the resin material layer comprises a resin material having a carbon-silicon bond, and the thickness of the resin material layer is equal to or less than 10 µm.

23. A radiative cooling device comprising an infrared radiative layer for radiating infrared light from a radiative surface and a light reflective layer disposed on the side opposite to the presence side of the radiative surface of the infrared radiative layer, wherein the infrared radiative layer comprises a resin material layer having a thickness adjusted to discharge a greater thermal radiation energy than absorbed solar light energy in a wavelength band ranging from 8 µm to 14 µm, and a resin material forming the resin material layer comprises a fluororesin or silicone rubber.

24. A radiative cooling device comprising an infrared radiative layer for radiating infrared light from a radiative surface and a light reflective layer disposed on the side opposite to the presence side of the radiative surface of the infrared radiative layer, wherein the infrared radiative layer comprises a resin material layer having a thickness adjusted to discharge a greater thermal radiation energy than absorbed solar light energy in a wavelength band ranging from 8 µm to 14 µm, a resin material forming the resin material layer comprises vinyl chloride resin or vinylidene chloride resin, and the thickness of the resin material layer is equal to or less than 100 µm and equal to or greater than 10 µm.

* * * * *